US012736665B2

(12) United States Patent
Moghaddam et al.

(10) Patent No.: US 12,736,665 B2
(45) Date of Patent: Sep. 15, 2026

(54) MULTI-FREQUENCY MICROWAVE IMAGING SYSTEM PROTOTYPE FOR MEDICAL IMAGING

(71) Applicant: University of Southern California, Los Angeles, CA (US)

(72) Inventors: Mahta Moghaddam, Rolling Hills Estates, CA (US); Yuan Fang, Los Angeles, CA (US); Kazem Bakian-Dogaheh, Los Angeles, CA (US)

(73) Assignee: UNIVERSITY OF SOUTHERN CALIFORNIA, Los Angeles, CA (US)

( * ) Notice: Subject to any disclaimer, the term of this patent is extended or adjusted under 35 U.S.C. 154(b) by 278 days.

(21) Appl. No.: 18/545,281

(22) Filed: Dec. 19, 2023

(65) Prior Publication Data

US 2024/0201365 A1 Jun. 20, 2024

Related U.S. Application Data

(60) Provisional application No. 63/433,734, filed on Dec. 19, 2022.

(51) Int. Cl.

| | |
|---|---|
| ***G01S 13/89*** | (2006.01) |
| ***G06T 17/00*** | (2006.01) |
| ***H01Q 9/04*** | (2006.01) |
| ***H01Q 21/22*** | (2006.01) |

(52) U.S. Cl.

CPC .............. *G01S 13/89* (2013.01); *G06T 17/00* (2013.01); *H01Q 9/0485* (2013.01); *H01Q 21/22* (2013.01)

(58) Field of Classification Search

CPC ....... G01S 13/89; G06T 17/00; H01Q 9/0485; H01Q 21/22

See application file for complete search history.

(56) References Cited

U.S. PATENT DOCUMENTS

| | | | | |
|---|---|---|---|---|
| 10,236,578 | B2 * | 3/2019 | Nysen | H01Q 5/15 |
| 2013/0135136 | A1 * | 5/2013 | Haynes | G01S 13/88 342/22 |
| 2018/0020926 | A1 * | 1/2018 | Stang | A61B 5/015 600/439 |
| 2018/0045658 | A1 * | 2/2018 | Gibbins | G01N 22/00 |

(Continued)

*Primary Examiner* — Nazra Nur Waheed

(74) *Attorney, Agent, or Firm* — Brooks Kushman P.C.

(57) ABSTRACT

A microwave imaging (MWI) system prototype to reconstruct three-dimensional (3D) complex dielectric images of various dielectric phantom models is provided. The imaging cavity of this system is filled with a newly compounded emulsion that provides a long-term stable and a controllable range of background-to-target dielectric contrasts. The system utilizes a tapered patch antenna array that enables multi-frequency operation. The the enhanced variational Born iterative method with bounding constraints (BC-VBIM) is applied as the inverse solver. Multiple experiments with various phantoms are conducted to evaluate the system's performance and imaging capabilities. Phantom models being used in this work for system evaluation include single, double, and multiple spherical targets filled with various water-isopropyl alcohol mixtures and submerged either directly in the background emulsion or within another water-alcohol mixture that is submerged in the emulsion.

17 Claims, 16 Drawing Sheets
(10 of 16 Drawing Sheet(s) Filed in Color)

(56) References Cited

U.S. PATENT DOCUMENTS

| | | | | |
|---|---|---|---|---|
| 2019/0021626 | A1 * | 1/2019 | Cano Garcia ........ | A61B 5/0507 |
| 2023/0309958 | A1 * | 10/2023 | LoVetri ................ | A61B 8/4209 |
| 2024/0183798 | A1 * | 6/2024 | Asefi ...................... | G01N 22/04 |

* cited by examiner (c)

(b)

(a)

MULTI-FREQUENCY MICROWAVE IMAGING SYSTEM PROTOTYPE FOR MEDICAL IMAGING

CROSS-REFERENCE TO RELATED APPLICATIONS

This application claims the benefit of U.S. provisional application Ser. No. 63/433,734 filed Dec. 19, 2022, the disclosure of which is hereby incorporated in its entirety by reference herein.

STATEMENT REGARDING FEDERALLY SPONSORED RESEARCH OR DEVELOPMENT

This invention was made with government support under Contract No. 80NSSC18K1410 awarded by NASA Earth and Space Science Fellowship (NESSF). The government has certain rights in the invention.

TECHNICAL FIELD

In at least one aspect, the present invention relates to systems and methods for dielectric imaging,

BACKGROUND

In the last few decades, microwave imaging (MWI) techniques have been widely used in biomedical applications [1]-[4]. Recent advances in imaging systems and algorithms have suggested MWI systems for diagnosis and treatment monitoring applications [5]-[9]. Among these, simulation-based designs have leveraged novel computational-electromagnetic forward and inverse scattering algorithms or artificial-intelligence-assisted methods to achieve high- and super-resolution imaging [10]-[14]. The realization of some of these designs has resulted in preclinical imaging systems capable of thermal therapy monitoring and identification of brain strokes, breast tumors, and bone fractures [15]-[19].

As an electromagnetic (EM) method, MWI evaluates targets through the scattered EM field that arises from the dielectric contrast between unknown targets and the background [1]. Instead of using ionizing radiation emitted from high-energy particles, MWI systems emit EM waves that are excited by antennas operating at microwave bands. Subsequently, MWI systems have no risk of ionization compared to computed tomography (CT) and X-ray scans [1], [3], [4]. Among the non-ionizing imaging systems, magnetic resonance imaging (MRI) has a higher resolution than MWI. However, a reasonable resolution can be achieved with MWI systems with potentially far lower cost and better compactness compared to overwhelmingly expensive and bulky MRI equipment [1], [3], [4], [8], [9], [15].

Despite the increasing number of studies in quantitative MWI systems, the vast majority of these works are still theoretical or simulation-based, and the realization of these systems in an experimental setting has not been proven or adopted widely [10]-[12], [19], [20]. The major areas of research that require substantive attention for pushing the state-of-the-art MWI systems toward a more practical stand-alone pre-clinical imaging equipment can be listed as follows [2].

1) Coupling Fluid: The coupling medium in the MWI cavity or chamber ensures a good match between a target and antenna to maximize energy transfer into the target region, and maintains the dielectric contrast between the coupling medium (which serves as background) and unknown targets within the validity regime of the inverse algorithm [16], [19], [21], [22]. Since most of the coupling media are in a liquid state, hereafter, we will use "coupling fluid" instead of "coupling medium."

Conventionally, the coupling fluid used in radar-based MWI systems needs to be non-dispersive while providing a reasonable background-target contrast to achieve good wave penetration into the object domain. Consequently, single-phase fluids, such as oil, have been used as coupling fluids in the qualitative MWI systems [23]. Inverse-scattering-based MWI systems that operate at discrete resonant frequencies can leverage the use of multi-phase fluids. For instance, a glycerin-water mixture and a water-in-oil-based emulsion have been reported as coupling fluids to control the dielectric contrast between the background medium and targets [21], [22], [24]. However, in practical systems where the imaging cavity is large, the glycerin-water mixture imposes an excessive loss on the transmitted signals, which may compromise the signal-to-noise ratio (SNR) of the system. Furthermore, for long-term imaging studies, the water-in-oil emulsion usually tends to break down within the duration of the experiment. To address these issues, a versatile coupling fluid that enables control on the relative permittivity, relatively low loss, and stays temporally and thermally stable is required for MWI systems and has been reported in [25].

2) Antenna and Array Design: While antenna design is a mature field of research in applied EM, many of the existing design methodologies are not applicable for MWI systems that transmit EM waves into the coupling fluid. Conventionally, antennas are being designed to operate in free space, with specific far-field parameters [26]-[29]. However, for microwave antennas immersed in a coupling fluid and surrounded by a reverberating shielded cavity, the EM wave has a combination of near-field and transition zone characteristics [30]-[34]. Therefore, instead of considering far-field parameters to design antenna and array structure, we need to treat antennas as transmitting and receiving waveports of MWI systems that outperform high-quality-factor radiative resonances in the presence of the coupling fluid inside a shielded cavity and achieve desirable SNR according to system dynamic range. Moreover, multi-frequency, miniaturized, and compact antennas are of relevance in order to achieve diverse resolutions and penetration depths, as well as reasonable spatial sampling for various imaging applications [35].

3) System Realization: When constructing an actual MWI system prototype from a theoretical simulation setting, it is crucial to ensure that observed data can be faithfully ingested by inverse algorithms. In addition to the selection of system equations [7], [13], an appropriate data acquisition system is required in order to transfer accurately measured information from numerous pairs of transmitting/receiving ports parallelly to the input interface of the inverse algorithm [19], [20]. As part of the data acquisition system, a proper data-postprocessing mechanism must be implemented, which includes data calibration and correction procedures to match the measured data with the simulated data to connect the MWI system prototype with its simulated design.

4) Inverse Algorithm: Ill-posedness, nonlinearity, and underdetermination of three-dimensional (3D) inverse scattering are the main challenges in 3D microwave imaging algorithms. Over the past few decades, various inverse scattering methods, such as the Born iterative method (BIM), distorted Born iterative methods (DBIM), and contrast source inversion (CSI), have been integrated with various optimization solvers, such as classical Newton, Gauss-Newton, conjugate gradient (CG) methods, as imaging algorithms for 3D microwave image reconstruction [7], [13], [36]-[41]. However, in the majority of cases, these approaches are evaluated using synthetic (simulation-based) data as input for inverse algorithms. It is necessary to study the competence of these algorithms in an actual experiment scenario, with measured data in the presence of noise and non-ideal situations, by either applying precondition imaging tests with a priori or black-box testing without a priori or accessible preconditioning.

High-level requirements for MWI subsystems have been outlined above in order to push the envelope in the direction of developing a practical microwave imaging platform that can function in a preclinical setting.

SUMMARY

In at least one aspect, a novel MWI system for quantitative 3D imaging is provided. The system includes the following components: 1) a newly compounded emulsion as the coupling fluid, 2) a new quad-band tapered patch antenna array, 3) an efficient data acquisition system along with a post processing scheme that provides processed data for the inverse algorithm to conduct dielectric imaging, and 4) an enhanced variational Born iterative method with bounding constraints (BC-VBIM) as the inverse algorithm. For the new emulsion, we developed a new water-in-oil emulsion that exhibits lower loss compared to most coupling fluids within the MWI operating frequency range (0.5-3 GHZ), and its dielectric values can be easily adjusted by changing the ratio of the sub-components [25]. The antenna design starts by constructing an imaging cavity that is filled by the coupling fluid. Accordingly, a tapered patch antenna array has been designed and fabricated, which operates at four different resonance frequencies, with the lowest frequency reaching 0.5 GHz and the highest frequency reaching 2 GHz [35]. The design technique takes into account both the near-field nature of the wave and the dynamic range of the receiver. For dielectric imaging, our 3D variational Born iterative method (VBIM) with boundary constraints (BC) and the conjugate gradient (CG) method is applied to reconstruct a complex dielectric map of the target. Finally, the system undergoes a comprehensive calibration procedure and post processing algorithm, to acquire the coherent scattering parameters of each transmit-receive pairs, where two lower resonance frequencies (545 MHz and 1115 MHz) are chosen in order to achieve proper signal-to-noise ratio.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a further understanding of the nature, objects, and advantages of the present disclosure, reference should be made to the following detailed description, read in conjunction with the following drawings, wherein like reference numerals denote like elements and wherein:

FIGS. 3A and 3B. (A) Single antenna structure and (B) antenna array structure on one panel. The antenna and antenna array optimization values (unit: mm) are denoted in the figure.

DETAILED DESCRIPTION

Figure 1A:
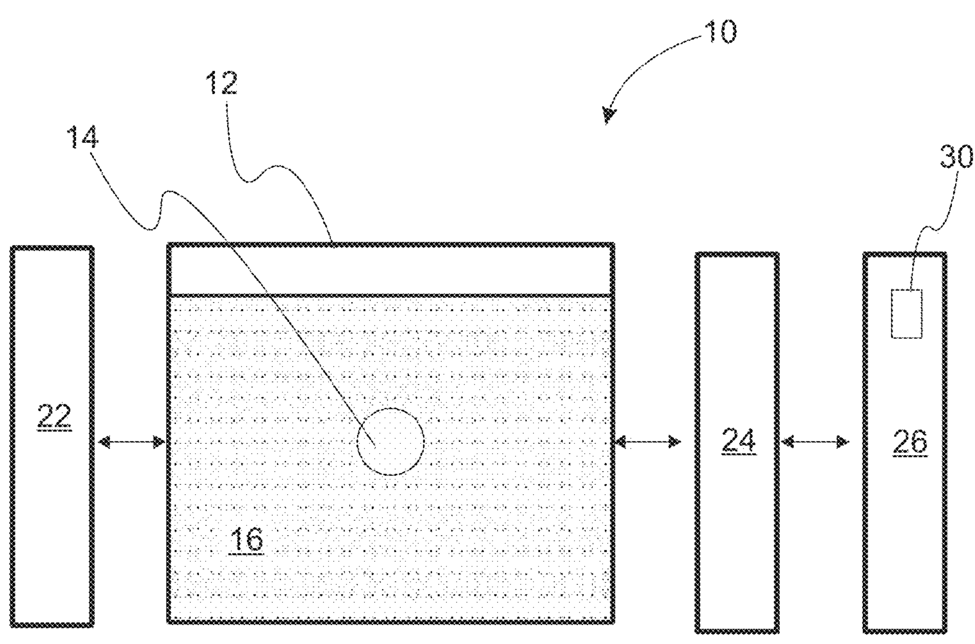
FIG. 1A. Schematic of an MWI system.

Reference will now be made in detail to presently preferred embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4, . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

When referring to a numerical quantity, in a refinement, the term "less than" includes a lower non-included limit that is 5 percent of the number indicated after "less than." A lower non-includes limit means that the numerical quantity being described is greater than the value indicated as a lower non-included limited. For example, "less than 20" includes a lower non-included limit of 1 in a refinement. Therefore, this refinement of "less than 20" includes a range between 1 and 20. In another refinement, the term "less than" includes a lower non-included limit that is, in increasing order of preference, 20 percent, 10 percent, 5 percent, 1 percent, or 0 percent of the number indicated after "less than."

In the examples set forth herein, experimental conditions can be practiced with plus or minus 50 percent of the values indicated rounded to or truncated to two significant figures of the value provided in the examples. In a refinement, experimental conditions can be practiced with plus or minus 30 percent of the values indicated rounded to or truncated to two significant figures of the value provided in the examples. In another refinement, experimental conditions can be practiced with plus or minus 10 percent of the values indicated rounded to or truncated to two significant figures of the value provided in the examples.

For any device described herein, linear dimensions and angles can be constructed with plus or minus 50 percent of the values indicated rounded to or truncated to two significant figures of the value provided in the examples. In a refinement, linear dimensions and angles can be constructed with plus or minus 30 percent of the values indicated rounded to or truncated to two significant figures of the value provided in the examples. In another refinement, linear dimensions and angles can be constructed with plus or minus 10 percent of the values indicated rounded to or truncated to two significant figures of the value provided in the examples.

With respect to electrical devices, the term "connected to" means that the electrical components referred to as connected to are in electrical communication. In a refinement, "connected to" means that the electrical components referred to as connected to are directly wired to each other. In another refinement, "connected to" means that the electrical components communicate wirelessly or by a combination of wired and wirelessly connected components. In another refinement, "connected to" means that one or more additional electrical components are interposed between the electrical components referred to as connected to with an electrical signal from an originating component being processed (e.g., filtered, amplified, modulated, rectified, attenuated, summed, subtracted, etc.) before being received to the component connected thereto.

The term "electrical communication" means that an electrical signal is either directly or indirectly sent from an originating electronic device to a receiving electrical device. Indirect electrical communication can involve processing of the electrical signal, including but not limited to, filtering of the signal, amplification of the signal, rectification of the signal, modulation of the signal, attenuation of the signal, adding of the signal with another signal, subtracting the signal from another signal, subtracting another signal from the signal, and the like. Electrical communication can be accomplished with wired components, wirelessly connected components, or a combination thereof.

The term "one or more" means "at least one" and the term "at least one" means "one or more." The terms "one or more" and "at least one" include "plurality" as a subset.

The term "substantially," "generally," or "about" may be used herein to describe disclosed or claimed embodiments. The term "substantially" may modify a value or relative characteristic disclosed or claimed in the present disclosure. In such instances, "substantially" may signify that the value or relative characteristic it modifies is within +0%, 0.1%, 0.5%, 1%, 2%, 3%, 4%, 5% or 10% of the value or relative characteristic.

The term "electronic component" refers is any physical entity in an electronic device or system used to affect electron states, electron flow, or the electric fields associated with the electrons. Examples of electronic components include, but are not limited to, capacitors, inductors, resistors, thyristors, diodes, transistors, etc. Electronic components can be passive or active.

The term "electronic device" or "system" refers to a physical entity formed from one or more electronic components to perform a predetermined function on an electrical signal.

It should be appreciated that in any figures for electronic devices, a series of electronic components connected by lines (e.g., wires) indicates that such electronic components are in electrical communication with each other. Moreover, when lines directed connect one electronic component to another, these electronic components can be connected to each other as defined above.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The terms "configured to" or "operable to" mean that the processing circuitry (e.g., a computer or computing device) is configured or adapted to perform one or more of the actions set forth herein, by software configuration and/or hardware configuration. The terms "configured to" and "operable to" can be used interchangeably.

When a computing device is described as performing an action or method step, it is understood that the computing device is operable to and/or configured to perform the action or method step typically by executing one or more lines of source code. The one or more action or method steps can be encoded onto non-transitory memory (e.g., hard drives, optical drive, flash drives, and the like).

It should be appreciated that when a device, and in particular, a computing device is described as performing a list of actions or configured to perform a list of actions, the device can perform any one of the actions or any combination of the actions. Similarly, when an item is described by a list of item choices (e.g., whereby each, a subset, or all of the one or more choices can be selected), the item can be any one of the item choices or any combination of the item choices.

Throughout this application, where publications are referenced, the disclosures of these publications in their entireties are hereby incorporated by reference into this application to more fully describe the state of the art to which this invention pertains.

Abbreviations

"AC" means almond and cashew.

"BC-VBIM" means Born iterative method with bounding constraints.

"LE" means lemon extract.

"MWI" means microwave imaging.

"VNA" means vector net-work analyzer.

"VO" means vegetable oil.

Figure 1B:
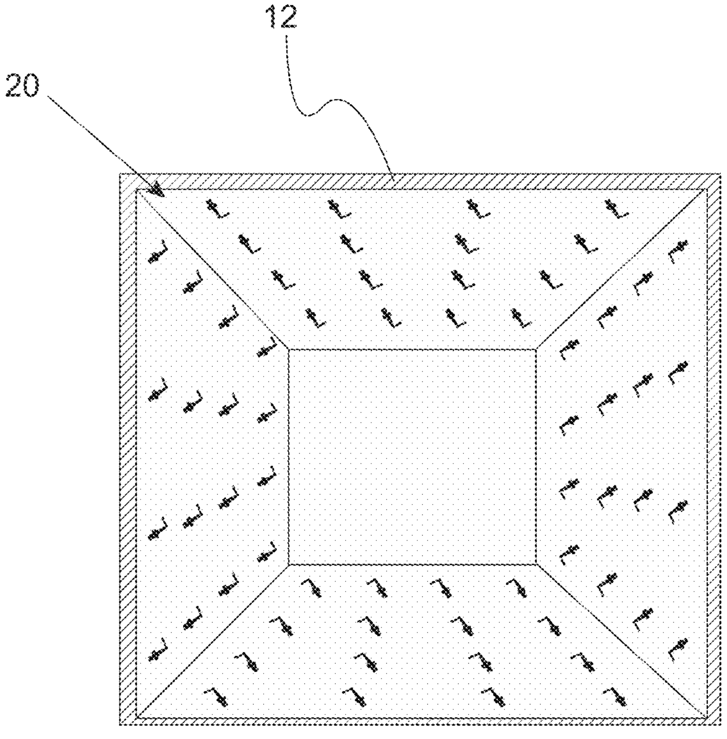
FIG. 1B. Schematic of the imaging cavity of the MWI system of FIG. 1*a*.
Figure 1C:
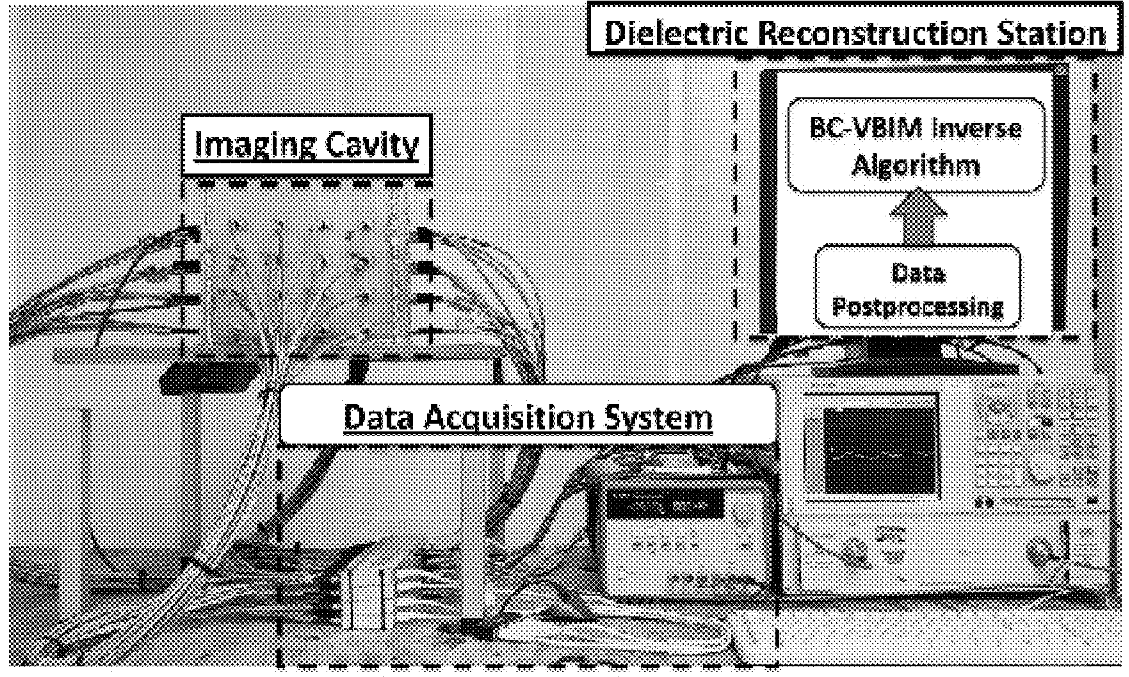
FIG. 1C. Photograph of the MWI system prototype configuration, containing imaging cavity, dielectric reconstruction station, and data acquisition system.

Referring to FIGS. 1A, 1B, and 1C, schematics illustrating a microwave imaging system are provided. Dielectric imaging system 10 includes an imaging cavity 12 for holding a sample 14 to be imaged. Coupling fluid 16 is disposed in the imaging cavity 12. A plurality of antennas 20 positioned in electrical communication with the coupling fluid 16. The plurality of antennas 20 is configured to have a plurality of resonant frequencies. The plurality of antennas 20 includes a first subset of antennas configured as receiver antennas and a second set of antennas configured as transmitter antennas. A source of power 22 for the plurality of antennas. Dielectric imaging system 10 includes a data acquisition and data post-processing system 24 in electrical communication with the plurality of antennas 20. Dielectric imaging system 10 also includes a dielectric reconstruction system 26 in electrical communication with the data acquisition and data post-processing system 24. In a refinement, dielectric imaging system 10 is configured to operate at frequencies from 0.5 to 3 GHz.

In another aspect, a 3D dielectric map is created from measured data at each resonance frequency. In a refinement, the 3D dielectric map is created from measured data at a plurality of resonance frequencies. In this regard, dielectric reconstruction system 26 can include one or more computing devices 30. Therefore, the dielectric reconstruction system can be configured to execute an inverse algorithm for dielectric imaging. Typically, one or more computing devices 30 are configured to execute one or more or all of the steps of the inverse algorithm for dielectric imaging. In a refinement, the inverse algorithm is an enhanced variational Born iterative method with bounding constraints (BC-VBIM). In a refinement, the inverse algorithm is a multi-frequency inverse algorithm that is based on the improved variational Born iterative method (VBIM) for three-dimensional (3D) quantitative microwave imaging. This method is capable of reconstructing the 3D dielectric relaxation model using measured data acquired at multiple transmit frequencies. A least-squares optimization using the conjugate gradient method with Tikhonov regularization is applied at each VBIM step to relax the memory requirements. Additional details of the inverse algorithm are provided in Fang, Yuan & Bakian-Dogaheh, Kazem & Moghaddam, Mahta. (2023). A Multi-Frequency Inverse Algorithm for 3D Microwave Imaging. IEEE Transactions on Antennas and Propagation. PP. 1-1. 10.1109/TAP.2023.3312771; the entire disclosure of which is hereby incorporated by references.

In another aspect, the inverse algorithm can utilize measured data at a plurality of resonance frequencies for 3D dielectric imaging.

In another aspect, the data acquisition and data post-processing system 24 is configured to execute data calibration and correction procedures. In a refinement, the data acquisition and data post-processing system is further configured to implement a calibration procedure and post-processing algorithm, to acquire coherent scattering parameters of each transmit-receive pairs. In a refinement, the data acquisition and data post-processing system 24 is configured to provide processed data to the dielectric reconstruction system.

In another aspect, the data acquisition and data post-processing system 24 includes vector network analyzers (VNA) that use coherent receivers to characterize the phase and magnitude of measured signals. The data acquisition and data post-processing system 24 can also include a plurality of switches configured to select the receiver and transmit channels.

In another aspect, the plurality of antennas is a tapered patch antenna array. In a refinement, the plurality of antennas is a quad-band tapered patch antenna array. Additional details for the plurality of antennas are in K. Bakian-Dogaheh. Y. Fang and M. Moghaddam, "A Quad-Band Near-Field Antenna Array for a Multistatic Microwave Imaging Chamber." in *IEEE Antennas and Wireless Propagation Letters*, vol. 22, no. 7, pp. 1657-1661, July 2023, doi: 10.1109/LAWP.2023.3257709; the entire disclosure of which is hereby incorporated by reference.

In another aspect, the coupling fluid is an oil-based emulsion. In another aspect, the coupling fluid includes food-grade oil, acid fluid, and protein-based mixture. In a refinement, the coupling fluid includes vegetable oil (VO) as a base, almond, and cashew (AC) milk as an emulsifier, and lemon extract (LE) as an acid to decrease the emulsion pH level and assist in emulsification. Additional details for a useful coupling fluid are found in Fang Y, Bakian-Dogaheh K, Stang J, Tabatabaeenejad A, Moghaddam M. A Versatile and Shelf-Stable Dielectric Coupling Medium for Microwave Imaging. IEEE Trans Biomed Eng. 2022 August; 69(8): 2701-2712. doi: 10.1109/TBME.2022.3153003. Epub 2022 Jul. 18. PMID: 35196220; the entire disclosure of which is hereby incorporated by reference.

The following examples illustrate the various embodiments of the present invention. Those skilled in the art will recognize many variations that are within the spirit of the present invention and scope of the claims.

I. MWI System Prototype

FIG. 1 shows an overview of the MWI system prototype, in which the imaging cavity incorporates 64 antenna elements. The imaging cavity has a size of 254 mm×254 mm×208 mm. Antennas are constructed on Rogers RO3210 laminate with $\epsilon r$=10.2 and 1.27 mm thickness. Each panel accommodates a 4×4 patch antenna array. Among 64 antennas, 16 elements are chosen to be transmitters while the remaining 48 are receivers. Therefore, 768 (16×48) data channels can be swept via the data acquisition system. The data are post-processed before applying into the BC-VBIM solver for dielectric reconstruction.

A. Coupling Fluid

The forward scattered signal between a cross-cavity transmit-receive pair can experience excessive attenuation when propagating through the large imaging cavity. Consequently, a coupling fluid with minimal loss, such as a multiphase oil-based emulsion, is of particular interest. As previously stated, water-in-oil emulsions tend to break down over time. Moreover, in the proposed system, 14 liters of fluid are required to fill the imaging chamber, which might significantly increase the cost of creating such a large volume using typical chemical emulsifiers such as Span 80 and Triton X-100. To this end, a new stabilized oil-based emulsion with the protein-acid emulsifier compounded from food industry materials that are readily available at local grocery stores is utilized. This emulsion consists of vegetable oil (VO) as the base, almond and cashew (AC) milk as the emulsifier, and lemon extract (LE) as the acid to decrease the emulsion pH level and assist in emulsification [25].

Figures 2A, 2B:
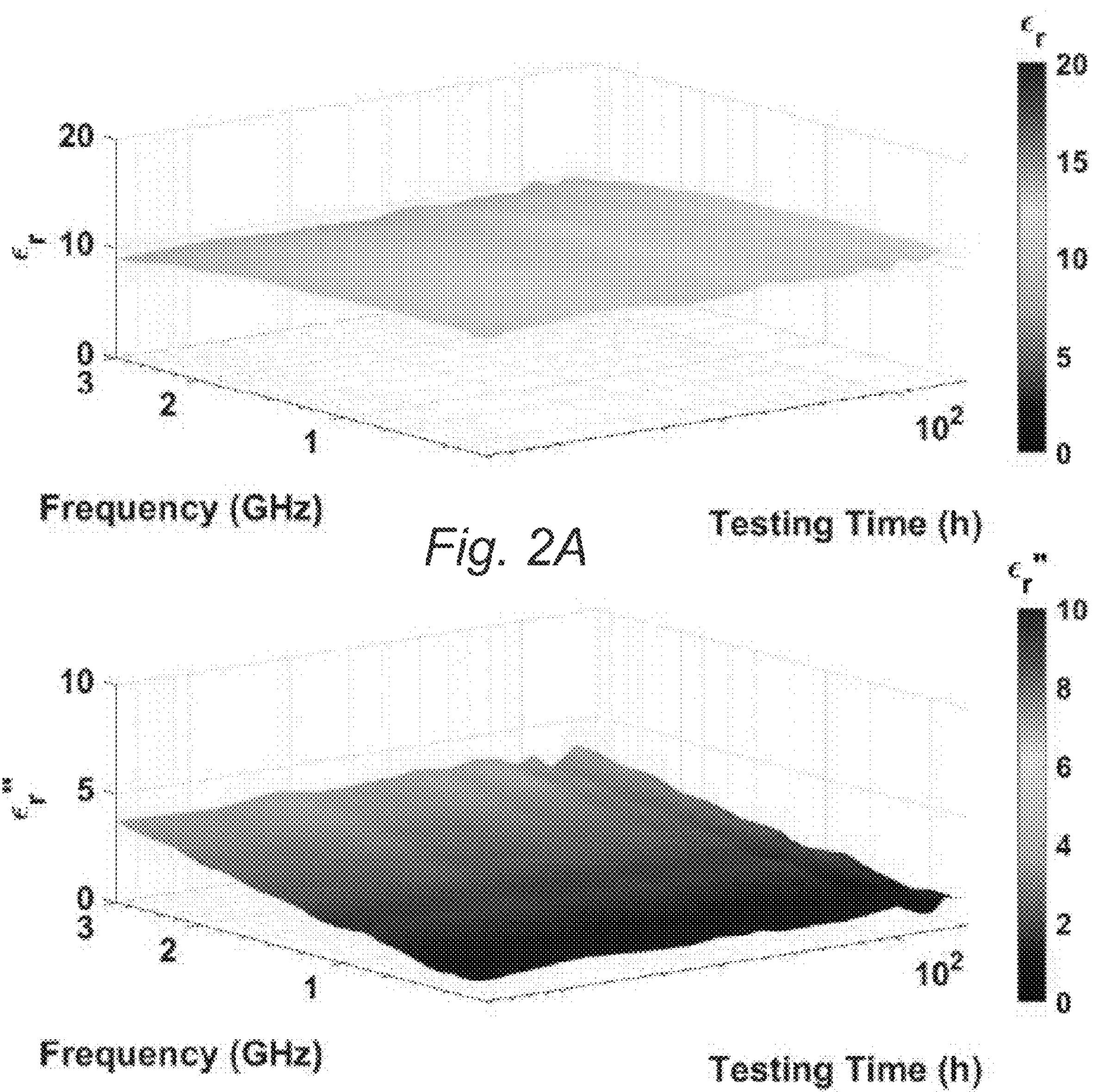
FIGS. 2A and 2B. The relative permittivity (A) and conductivity (B) value during the 7-day (168 hours) dielectric measurement within the MWI frequency range.

The complex dielectric permittivity of the emulsion in this section is denoted as $$\tilde{\epsilon}_r = \epsilon_r - j\epsilon_r'' = \epsilon_r - j\sigma/(\omega\epsilon_0),$$

where $\epsilon_r$ represents the relative permittivity, $$\epsilon_r''$$

is associated with the loss (imaginary parts of the permittivity) and alternatively can be expressed by electrical conductivity ($\sigma$) of the fluid. The dielectric behavior of emulsion results from the collective contribution of each ingredient. After measuring dielectric properties and evaluating thermal and temporal stabilities of multiple samples with varied constituent ratios (AC, LE, and VO), it was determined that a ratio of AC:LE:VO of 1:1:5 was optimal for our imaging application while meeting system-level requirements such as dynamic range [25]. FIG. 2 depicts both real and imaginary parts of the complex dielectric constant of our emulsion, which is stable across a 7-day testing period. This dielectric range for the coupling fluid as background compared to the dielectric values of biological tissues resulted in dielectric contrasts of no more than 6, indicating that our emulsion is compatible with the majority of inverse algorithms, including BIM, DBIM, and VBIM [25],[40], [42].

B. Quad-Band Tapered Patch Antenna

The presence of coupling fluid in the proximity of antennas imposes a major difference between the design process of near-field microwave imaging antennas and conventional far-field antennas that radiate into free space. Therefore, a fresh look was taken at designing antenna and array systems that operate in the near-field for the quantitative microwave imaging application. Also, a new set of figures of merit are provided and exploited to evaluate the performance of MWI antennas system. Based on the requirements and figures of merit, we reported a step-by-step design mechanism for a quad-band antenna system that transmits into the imaging chamber filled with the coupling fluid [25], [35]. The design achieves compactness, high spatial sampling, and four resonance frequencies in the range of 0.5 to 3 GHz.

Figure 3B:
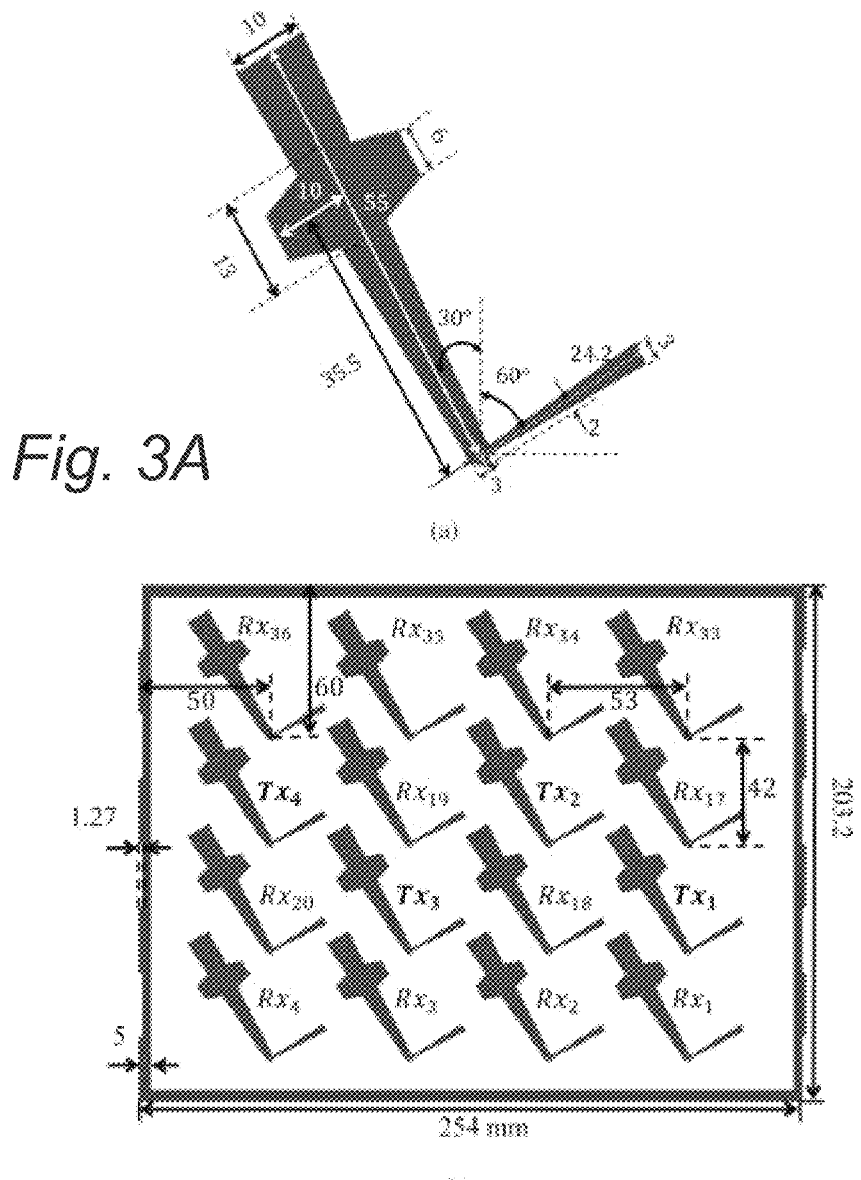

Conventional antenna design seeks to satisfy antenna far-field parameters such as gain, radiation pattern, and return loss (S11). Nevertheless, antennas in near-field quantitative microwave imaging applications are optimized to achieve a high Q-factor radiative resonance that exhibits a reasonable S11 and an S21 above the system noise floor [35]. Details of our antenna array design process and its performance are provided in [35]. The geometry and corresponding sizes of the single antenna and antenna array are shown in FIGS. 3(A) and (B), and the final design values are listed in these figures. Through a statistical approach, the four resonance frequencies of the system were determined to be 545 MHz, 1115 MHz, 1525 MHz, and 2045 MHz. However, because of the limited dynamic range of the system and maintaining the −60 dB numerical accuracy, we have higher confidence in the lower two resonances; therefore, we use measured data from two frequencies, 545 MHz and 1115 MHz, in the MWI system prototype for dielectric imaging.

C. Data Acquisition System

Figure 4:
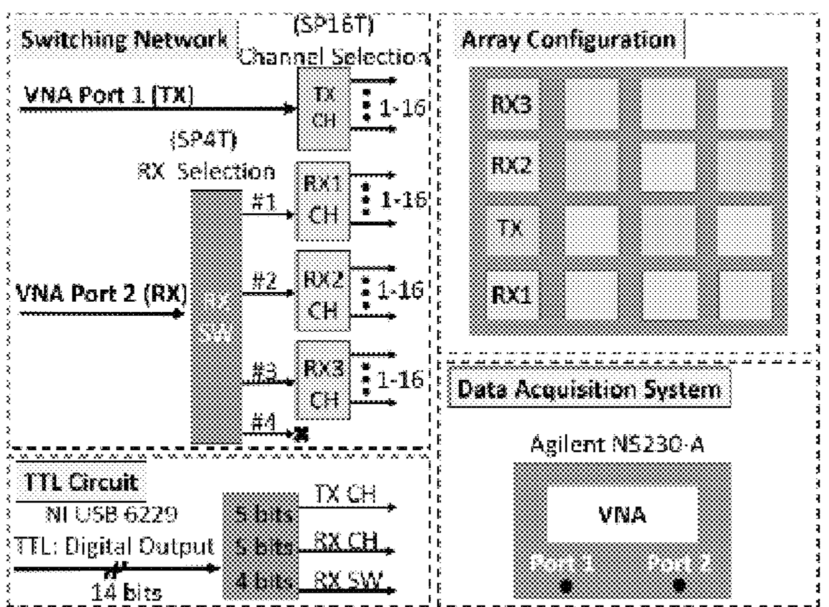
FIG. 4. The data acquisition system along with switching network, TTL control circuit, and Array configuration.

The quantitative microwave imaging system relies on VNAs as the core of data acquisition systems. VNAs use coherent receivers to characterize the phase and magnitude of the measured signals. The fully calibrated S21 signal in the prototype system is being measured by using a standard command for programmable instruments (SCPI) script that control an N5230-A Agilent VNA. FIG. 4 shows the data acquisition system configuration, which consists of one SP4T to select between Rx switches, and four SP16T to select between each Rx or Tx channel. In this configuration, Txs are located at the center, Rx1 are at the bottom closest to the conducting bottom plate, Rx2 are the complementary zig-zag of transmitters, and Rx3 are at the panel top. These RF switches are controlled by a 14-bit TTL signal provided by the digital port of the National Instrument NI-USB6629

The Algorithm 1 shows the data acquisition and post-processing workflow, including error term extraction, measurement, offline calibration, and sign correction procedures.

It should be noted that, even though the system is capable of operating at two frequencies, the imaging results reported in this study are obtained from a single discrete frequency reconstruction, which is the same as that presented in [44]-[46]. The major goal in this work is to ensure that the MWI system prototype and imaging algorithm can provide an accurate 3D dielectric map using measured data at each resonance frequency. Therefore, the isolated impact of each single-frequency would be fully understood before proceeding to a dual-frequency reconstruction. In a forthcoming paper, we will illustrate a new multi (dual)-frequency dielectric imaging algorithm for our system prototype.

D. Inverse Algorithm: BC-VBIM

MWI systems are commonly integrated with a vector net-work analyzer (VNA) that measures S-parameters, despite simulation-based imaging investigations that may directly provide EM fields in each voxel. Therefore, we use the normalized S-parameter volume integral equation (SVIE) for dielectric imaging in our MWI system with M×N measured data channels and Q voxels in the inverse domain [13], [19], [41].

$$\frac{S_{n,m}^{s(mea)}}{S_{n,m}^{b(mea)}} = \frac{k_b^2}{S_{n,m}^{b(sim)}} \int_V \chi(r') G_{n,m}(r_n, r') \cdot E(r') dv',\ r' \in V \tag{1}$$

where $$S_{n,m}^{s/b\left(\frac{mea}{sim}\right)}$$

is the scattered/background S-parameter measured/simulated from the data channel with the combination of receiving (Rx) antenna n and transmitting (Tx) antenna m ($m \in [1,M]$ and $n \in [1,N]$). The waveport vector Green's function (WVGF) $G_{n,m}(r')$ is derived according to [41], [47]. Dielectric contrast $\chi(r')$ between target and background at location r' is:

$$\chi(r') = \frac{\tilde{\epsilon}_r(r')}{\tilde{\epsilon}_{rb}} - 1, \tag{2}$$

where $\tilde{\epsilon}_{rb}$ and $\tilde{\epsilon}_r(r')$ are the complex relative permittivities of the background and target.

The inverse algorithm reconstructs the dielectric image through minimizing the $L_2$-norm cost function F, which is determined by the box constrained (BC) unknown model variable x, preconditioned model variable $X_{pre}$, the total field in the inverse domain V, and the measured data b:

$$F(x, b) = \frac{C_b^{-1}}{2} \|b - Ax\|^2 + \frac{C_x^{-1}}{2} \gamma \|x - x_{pre}\|^2 \tag{3}$$

where the Tikhonov regularization term γ, covariance matrices $C_b$ and $C_x$ are defined in [41]. The pth element ($p=(m-1)\times N+n$) in vector b, qth element in vector x, and element at pth row and qth column in matrix A can be expressed as follows [41]:

$$b_p = \frac{S_{n,m}^{s(mea)}}{S_{n,m}^{b(mea)}},\ x_q = \chi(r_q), \tag{4}$$

$$A_{p,q} = \frac{k_b^2}{S_{n,m}^{b(sim)}} G_{n,m}(r_n, r'_q) \cdot E(r'_q) \Delta V_q$$

Algorithm 1 Data acquisition and postprocessing workflow

```
    Error terms extraction:
 1: for i = 1 : 64 do                                        ▷ Manual
 2:    Disconnect the cables from antenna array;
 3:    Full one-port calibration using open, short, load (OSL)
    standards for each cable end;
 4:    Save one-port calibration files;
 5:    Connect cables to antenna;
 6: end for
 7: for j = 1 : 768 do                                       ▷ SCPI script
 8:    Unknown thru calibration by SCPI script;
 9:    Saving 12 Error terms;
10: end for
    Measurement:
 1: for i = 1 : 768 do                                       ▷ SCPI script
 2:    Correction off;
 3:    Set frequency at 545 MHz and 1115 MHz;
 4:    Select channel by NIUSB6229 TTL;
 5:    Trigger VNA and store full 2-port S-parameters;
 6: end for
    Calibration:                                             ▷ Offline
 1: Load error terms in MATLAB;
 2: Load uncalibrated measured S-parameters;
```

-continued

| Algorithm 1 Data acquisition and postprocessing workflow |
|---|
| 3: Run the 2-port error correction (calibration script) [43]; |
| Sign Correction: ▷ Offline |
| 1: Extract the sign of the simulated S-parameters from numerical solver: |
| 2: Correct the sign of the measured data according to simulation; |

The variational Born iterative method with bounding constraint (BC-VBIM) workflow is listed in Algorithm 2. With the pre-condition vector w that can be input as a-priori information or with no precondition and in black-box test condition w=0. The Born approximation inversion is conducted in line 2 and line 3 to generate the initial reconstructed unknown model variable $x_1$ before the BC-VBIM loop from line 5. Instead of direct reconstruction of $x_k$ and $\delta x_k$ at each iterative step as in [41], the BC-VBIM reconstructs the intermediate variable $y_k$ and $\delta y_k$ that are within the unconstrained range $(-\infty,\infty)$, then transforms $y_k$ back to $x_k$ that is constrained in the range [c, d] [40]. During the reconstruction, these bounding constraints are introduced to avoid anomalies with negative non-physical dielectric values. The minimization is achieved through solving the partial derivative equation with respect to y in lines 3 and 9 with equations below:

$$\frac{\partial F}{\partial y} = \frac{\partial F}{\partial x} \cdot \frac{\partial x}{\partial y} \tag{5}$$

$$\frac{\partial x}{\partial y} = \frac{(c-d)\exp(y)}{[1+\exp(y)]^2} \tag{6}$$

Algorithm 2 The BC-VBIM workflow

```
Input: b_1 = b^mca,; x_0 = 0, x_pre = w;

Initial values: E_1 ≈ E_b^sim, k = 1;

1:  procedure BC-VBIM(b_1, x_0, E_1)
2:    Calculate matrix A_1 with (4) and input E_1, x_0;
3:    y_1 ← ∂F(y,b_1)/∂y = = 0;
4:    x_1 = [c + dexp(y_1)]/[1 + exp(y_1)];
5:    for k ≥ 2 do                         ▷ BC-VBIM Start
6:      ∂b_k = A_{k-1}x_{k-1} − b_{k-1};
7:      Update E_k with forward algorithms;
8:      Calculate A_k with E_k and x_{k-1} through (4);
9:      ∂y_k ← ∂F(δy_k, δb_k)/∂(δy_k) = = 0;
10:     y_k = δy_k + y_{k-1}:
11:     x_k = [c + dexp(y_k)]/[1 + exp(y_k)];
12:     if ||b^mca − A_k x_k||/||b^mca|| ≤ ξ then
13:       return x_k;
14:     end if
15:   end for
16: end procedure = 0
```

II. Results and Discussion

Figure 5C:
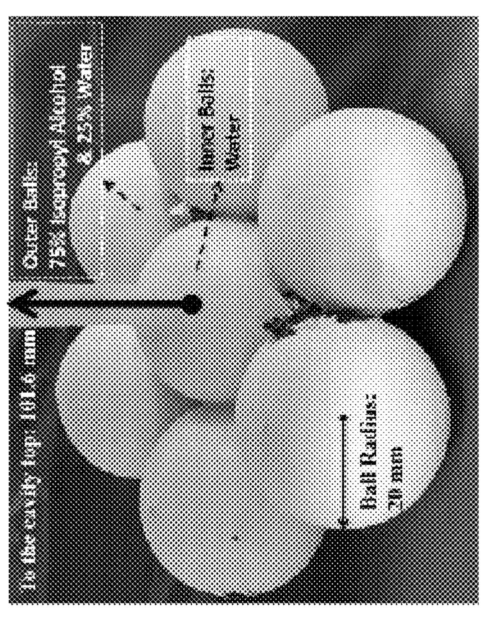
FIGS. 5A, 5B, and 5C. The configuration of phantoms 1 (A), 2 (B), and 3 (C). All geometric sizes and phantom materials are denoted in the figure.
Figure 5B:
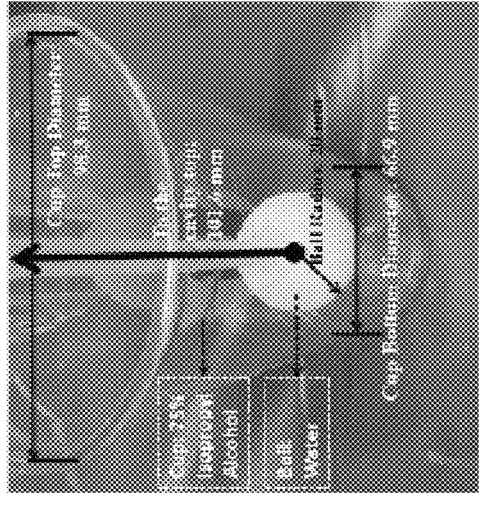
Figure 5A:
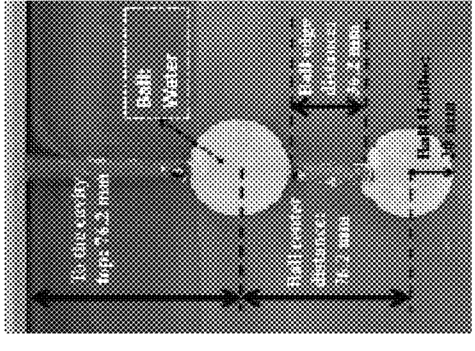
Figure 6A:
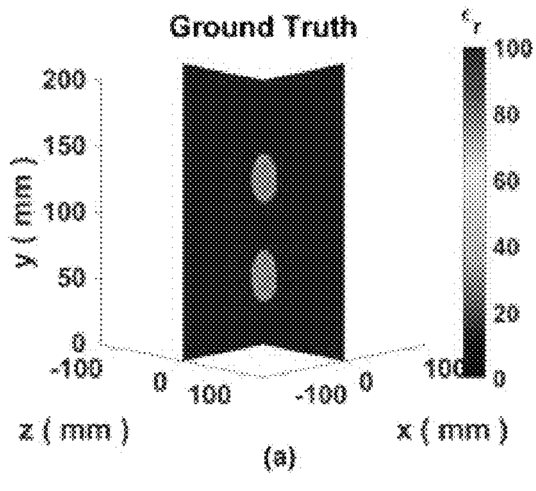
FIGS. 6A, 6B, 6C, and 6D. The relative permittivity images at 1115 MHz of Phantom 1 in 3Dview (A, B), and xy-view (C, D). Images at left column are the ground truth. Right-column images are the reconstructed results from the BCVBIM inverse algorithm.
Figure 6B:
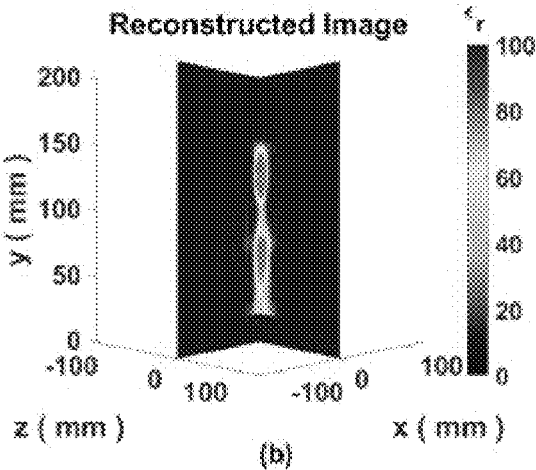
Figure 6C:
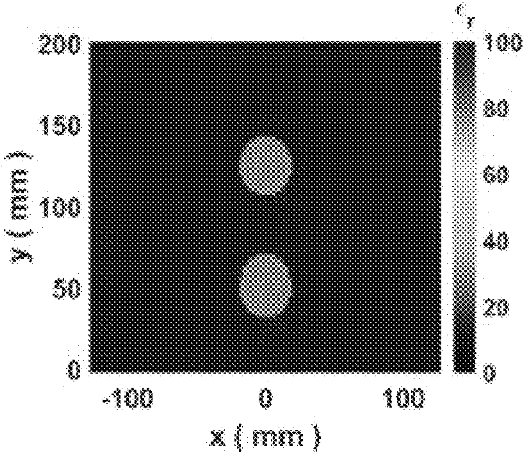
Figure 6D:
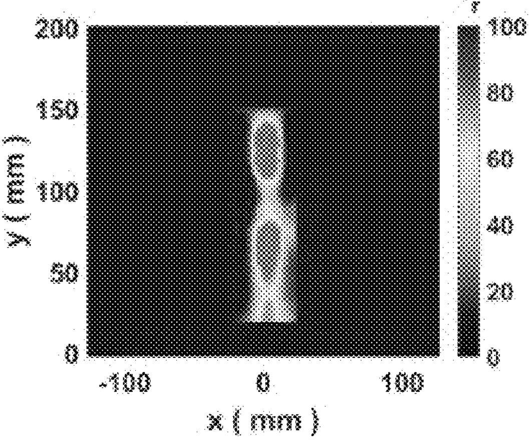
Figure 7A:
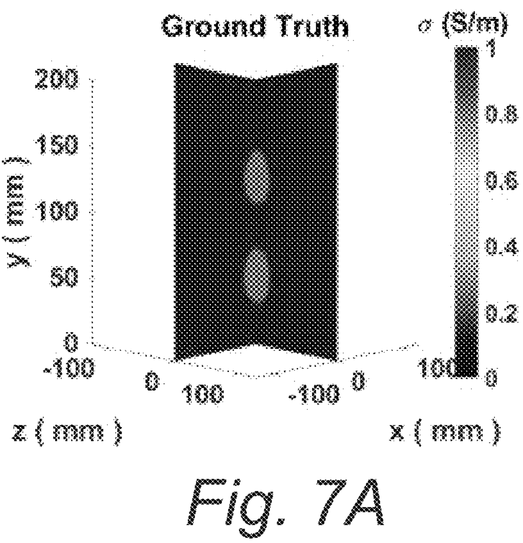
FIGS. 7A, 7B, 7C, and 7D. The conductivity images at 1115 MHz of Phantom 1 in 3D-view (A, B), and xy-view (C, D). Images at left column are the ground truth. Right-column images are the reconstructed results from the BC-VBIM inverse algorithm.
Figure 7B:
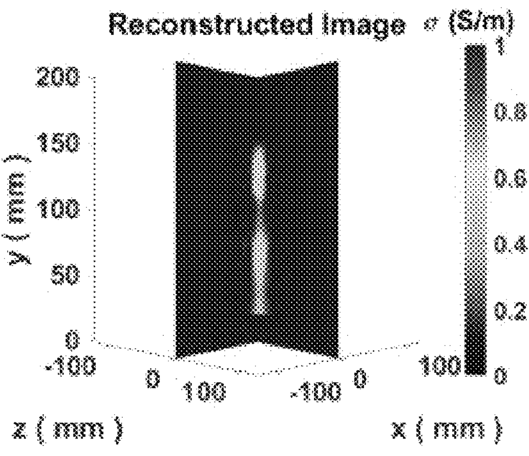
Figure 7C:
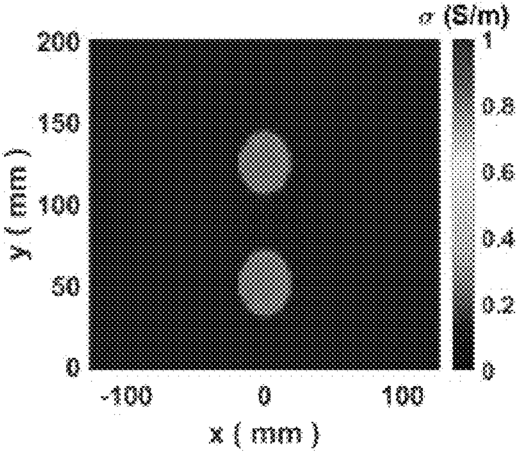
Figure 7D:
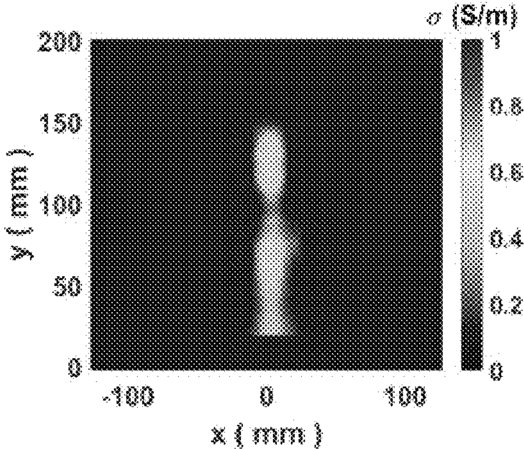
Figure 8A:
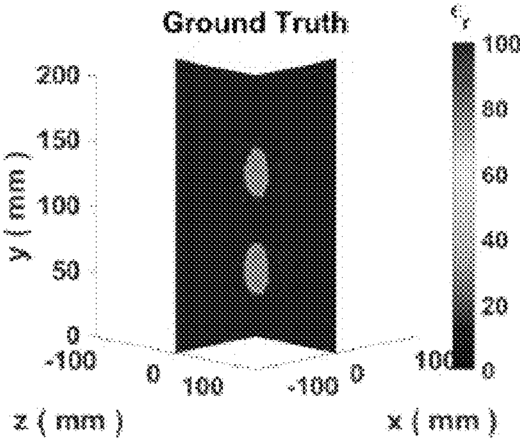
FIGS. 8A, 8B, 8C, and 8D. The relative permittivity images at 545 MHz of Phantom 1 in 3D-view (A, B), and xy-view (C, D). Images at left column are the ground truth. Right-column images are the reconstructed results from the BC-VBIM inverse algorithm.
Figure 8B:
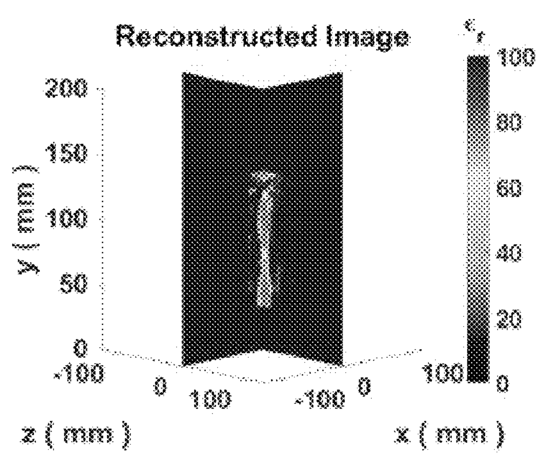
Figure 8C:
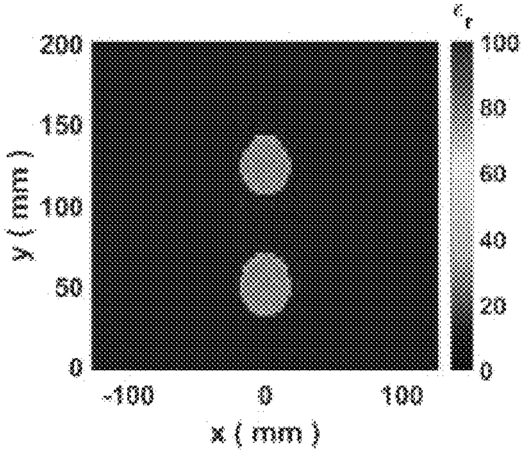
Figure 8C:
Figure 8D:
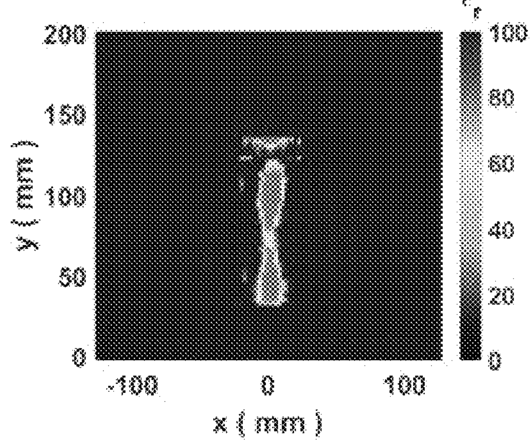
Figure 9A:
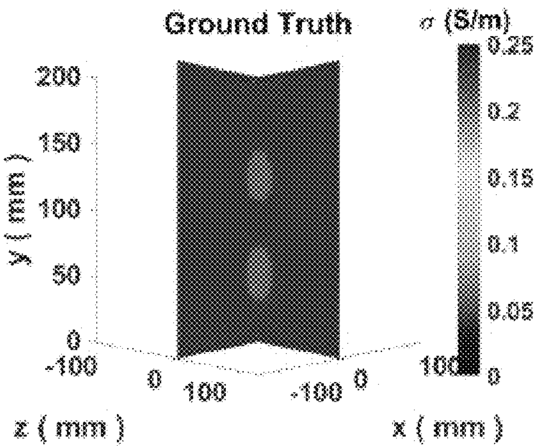
FIGS. 9A, 9B, 9C, and 9D. The conductivity images at 545 MHz of Phantom 1 Phantom 1 in 3D-view (A, B), and xy-view (C, D). Images at left column are the ground truth. Right-column images are the reconstructed results from the BC-VBIM inverse algorithm.
Figure 9B:
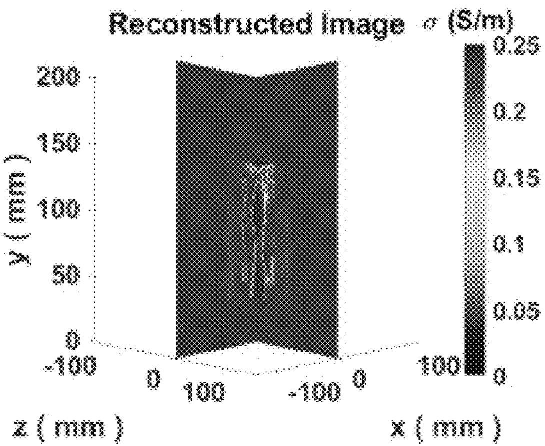
Figure 9C:
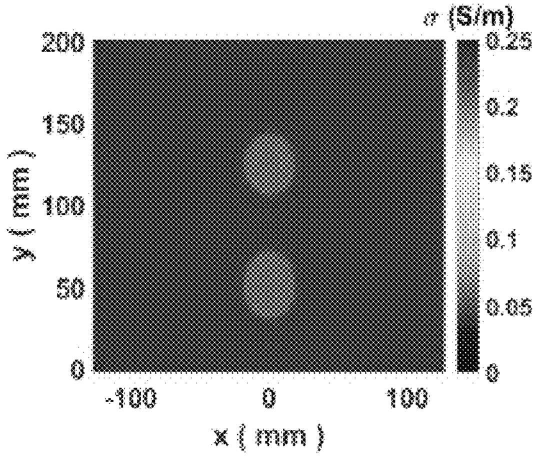
Figure 9C:
Figure 9D:
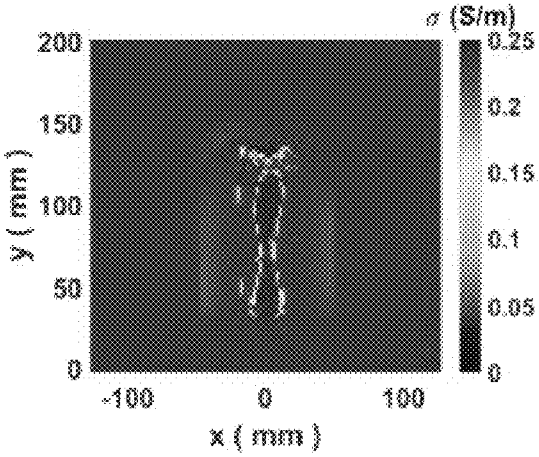

In this section, three phantom models are evaluated with the proposed MWI system prototype to determine its performance under various imaging scenarios. FIG. 5 illustrates the geometry and configurations of all of the phantom models. The first phantom (Ph 1) in FIG. 5(A) is composed of two isolated balls that are vertically separated from one another. FIG. 5(B) shows the second phantom (Ph 2), which is a ping-pong ball encompassed within a cup. Phantom 3 (Ph 3) in FIG. 5(C) is a cluster of ping-pong balls, a more elaborate version of Ph 2. The locations of the inner ping-pong ball in Ph 2 and 3 are at the cavity center (0, 101.6, 0) mm, while the locations of the upper and lower balls in Ph 1 are (0, 127, 0) mm and (0, 50.8, 0) mm, respectively. The ping-pong balls connected to the plastic straws in all phantom models are filled with water, and they are referred to as targets (not to be confused with objects). The cup of Ph 2 in FIG. 5(B) and the outer six balls of Ph 3 in FIG. 5(C) are filled with a 75% isopropyl alcohol-25% water mixture, and they are referred to as surrounding objects in the following sections. According to the information previously provided, the frequencies used in our MWI system are 545 MHz and 1115 MHz. Table I presents the complex dielectric constants of water, isopropyl alcohol/water mixture, and the coupling fluid at MWI system operation frequencies. All phantom models are imaged under the black-box test condition, in which no a priori information about the targets or objects is known. The inverse domain size for black-box imaging is 180 mm×160 mm×180 mm along the X, Y, and Z axes, respectively, and the size of each voxel is 2 mm×2 mm×2 mm [41].

TABLE I

DIELECTRIC VALUES OF PHANTOM MATERIALS AND COUPLING FLUID

| | 545 MHz | | 1115 MHz | |
|---|---|---|---|---|
| | $\epsilon_r$ | σ (S/m) | $\epsilon_r$ | σ (S/m) |
| Water | 78.34 | 0.06 | 78.16 | 0.26 |
| 75% Isopropyl Alcohol | 29.94 | 0.11 | 26.72 | 0.50 |
| Coupling Fluid | 12.95 | 0.04 | 12.66 | 0.12 |

A. Phantom 1: Two Discrete Off-Centered Balls

One figure of merits to evaluate the performance of a MWI system is the detection limit of multiple closely spaced targets. Simulation analysis of 3D underdetermined MWI full-wave algorithms in the frequency domain shows that the minimum distance to distinguish between multiple targets should be at least $0.25\lambda_b$, where $$\lambda_b = \lambda_0/\sqrt{\epsilon_b'}$$

[48]-[50]. In our scenario, the background wavelength $\lambda_b$ at 545 MHz is 153.0 mm, and $\lambda_b$ at 1115 MHz is 75.6 mm. FIG. 5(A) shows that in Ph 1, the edge distance d of the two ping-pong balls is 36.2 mm. At 1115 MHz, $d>0.25\lambda_b$, whereas at 545 MHz, $d<0.25\lambda_b$.

Imaging results at 1115 MHz in FIG. 6 and FIG. 7 indicate that our MWI system prototype can detect the two discrete targets separated by a distance larger than 0.25λ b, which is expected based on the above reasoning. Beyond distinguishing multiple targets, the targets' location, size, and dielectric properties are accurately reconstructed.

At the lower frequency (545 MHz), reconstructed image qualities in FIG. 8 and FIG. 9 are not as good as the results in FIG. 6 and FIG. 7, and distinguishing two discrete targets at the distances given is difficult. Particularly, locating the upper target using the reconstructed results with data at 545 MHz is not as successful as the one with data at 1115 MHz. While the observed anomaly in the reconstructed image still suggests the existence of an extended target in the imaging domain, other information can be inferred from results with high confidence. For instance, the target possible locations, dielectric distribution area, and the range of the dielectric value can be found in FIGS. 8 and 9.

The imaging results presented in this paper are reconstructed with our 3D full-wave inverse algorithm. In order to improve the image resolution in FIGS. 8 and 9, near-field inverse algorithms may be considered [48], [51], [52], but the distance between the phantom models and Tx/Rx antennas is larger than λb at 1115 MHz, which makes the near-field inverse algorithm unsuitable for dielectric reconstruction. Therefore, we proceed to use our full-wave inverse algorithm, BC-VBIM, for the dielectric reconstruction in the remaining section. Moreover, the background media in most near-field applications are free-space, half-space, and layered media, and these Green's functions are analytical and easy to apply the near-field approximation. Conversely, the WVGF used in our imaging algorithm is numerically calculated owing to the heterogeneous background including coupling fluid, antenna, substrates, and air interface [38], [47]. It is not trivial to apply the near-field approximation.

TABLE II

RMSE OF ALL BLACK-BOX RECONSTRUCTED MODELS

| | Ph 1 | Ph 2 | Ph 3 |
|---|---|---|---|
| 545 MHz | 15.4 | 7.8 | 10.4 |
| 1115 MHz | 11.1 | 6.6 | 9.9 |

TABLE III

AVERAGE VOXEL ERROR OF ALL BLACK-BOX RECONSTRUCTED MODELS

| | Ph 1 | Ph 2 | Ph 3 |
|---|---|---|---|
| 545 MHz | 31.6% | 25.7% | 18.1% |
| 1115 MHz | 16.5% | 12.3% | 14.3% |

To quantify the reconstructed image quality, we use the root mean square error (RMSE) defined in (7) and averaged voxel error (AVE) defined in (8):

$$RMSE = \sqrt{\frac{\sum_{q=1}^{Q} |\tilde{\epsilon}^{recon}(r_q) - \tilde{\epsilon}^{true}(r_q)|^2}{Q}} \quad (7)$$

$$AVE(\%) = \frac{1}{Q}\sum_{q=1}^{Q} \frac{\left|\int_{r'_q \in V_q} \left[\tilde{\epsilon}^{recon}(r'_q) - \tilde{\epsilon}^{true}(r'_q)\right] d(r'_q)\right|}{\left|\int_{r'_q \in V_q} \left[\tilde{\epsilon}^{true}(r'_q)\right] d(r'_q)\right|} \times 100\% \quad (8)$$

where $$\tilde{\in}^{true}(r'_q) \text{ and } \tilde{\in}^{recon}(r'_q)$$

are the true and reconstructed complex permittivities in qth voxel, respectively. The recon-structed RMSE and AVE of all tested phantom models are reported in Tables II and III. In Ph 1 experiment, both RMSE and AVE values at 1115 MHz are smaller than those at 545 MHz. The overall Ph 1 reconstruction accuracy of our MWI system prototype and associated imaging algorithm can reach 83.5% for measured data at 1115 MHz. The accuracy decrease to 68.4% with measured data at 545 MHz.

B. Phantom 2: Single Ping-Pong Ball Inside Cup

In many MWI studies, the imaging is conducted with prior information used as preconditioners for inverse algorithms, such as the geometry, location, and possible initial dielectric map of the targets and surrounding objects [7], [13], [14], [37]. For instance, some MWI systems for brain stroke and breast tumor detection use MRI data and corresponding inferred dielectric constants of patients' healthy tissues as the preconditioners of the inverse algorithms [13], [20]. In this subsection, we investigate the differences between preconditioned and black-box dielectric reconstruction using Ph 2, and show how preconditioners such as the shape and geometry of the surrounding objects can help to estimate a more accurate 3D dielectric map.

FIG. 5(D) shows Ph 2 that is tested for our MWI system in this subsection. The ping-pong ball "target" is filled with water. The plastic cup "object" is filled with 75% isopropyl alcohol-25% water mixture. In the black-box test, dielectric and geometric properties of neither the ball nor the cup are known. For the preconditioned imaging, the cup size, shape, and dielectric properties are pre-input into the inverse algorithm, which is an appropriate preconditioner is the same as that used in [7], [13].

Figures 10A, 10B, 10C, 10D, 10E, 10F, 10G, 10H:
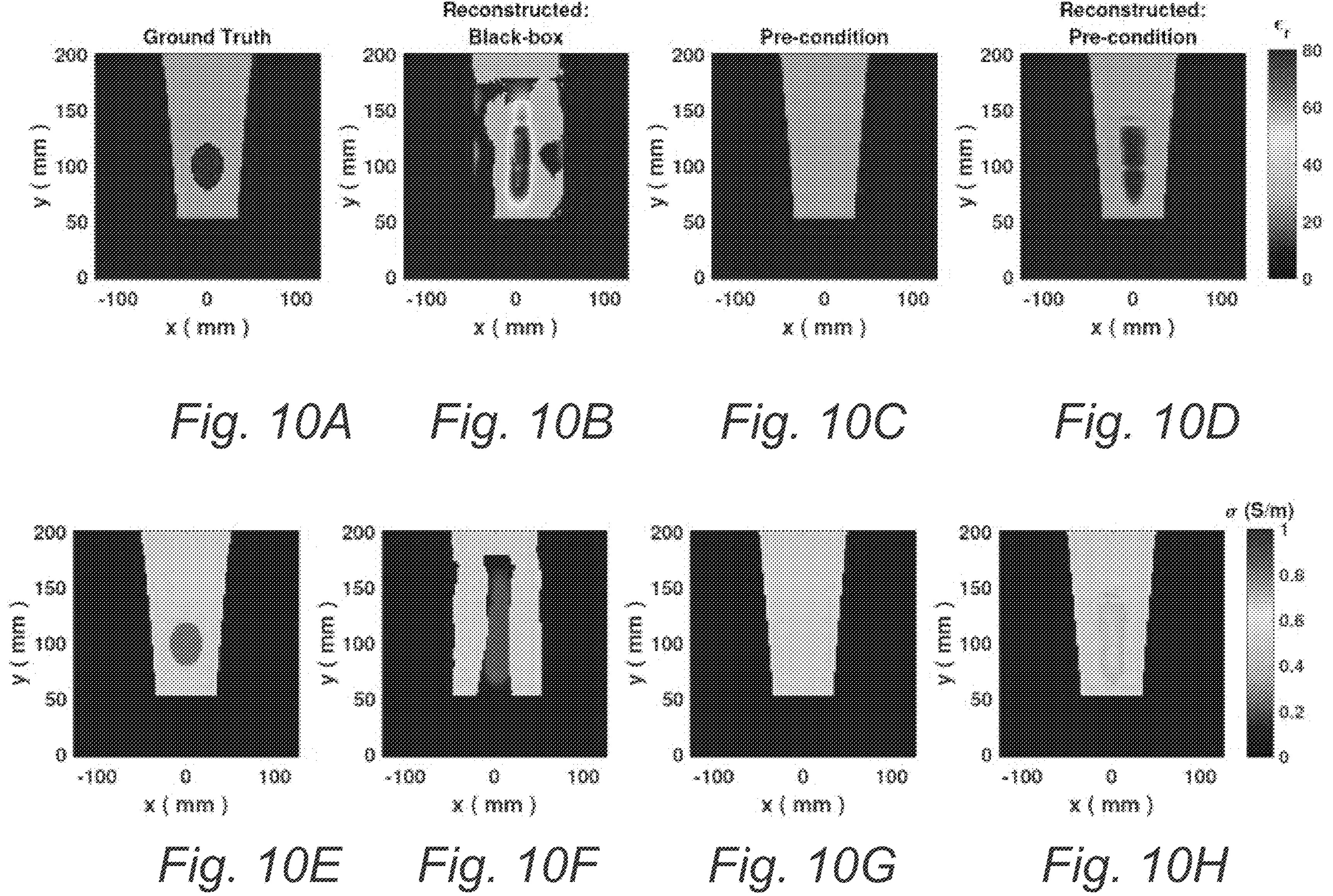
FIGS. 10A, 10B, 10C, 10D, 10E, 10F, 10G, and 10H. The relative permittivity images at 1115 MHz of Phantom 2 in xy-view. Images at top row are the relative permittivty, and bottom-row images are the conductivity. (A), (E) are the ground truth relative permittivity and conductivity images; (C), (G) are the preconditioned dielectric maps for the BC-VBIM inverse algorithm; (B), (F) are the reconstructed results under the black-box test; (D), (H) are the reconstructed results with the preconditions in (C) and (G).

FIG. 10 shows the reconstructed images with measured data at 1115 MHz under the black-box test and preconditioned imaging. Comparing the black-box reconstructed im-ages (FIGS. 10(B), (F)) with the ground truth images (FIGS. 10(A),(E)), our MWI system can detect the target and estimate the dielectric contrast between target and surrounding object. The size, shape, and dielectric values of the surrounding object can only be estimated approximately, and there are vacancies in the surrounding object area in FIGS. 10(B), (F). Furthermore, the reconstructed conductivity map and voxel values of the target show large deviations from ground truth in FIG. 10(F). One reason may be that the scattered wave has lost the majority of its energy in the surrounding object, which is larger and more lossy than the target, and the majority of the information contained in the scattered wave corresponds to the object (not target) properties. The black-box reconstructed images at 545 MHz (FIGS. 11(B), (F)) supports this theory. Since the isopropyl/water mixture is less lossy at 545 MHz, the cup shape is reconstructed more accurately than the results in FIGS. 10(B), (F). On the contrary, the dielectric values of the cup and the location of the target ball deviate from the ground truth images, which leads to larger RMSE and AVE values than the reconstructed results at 1115 MHz.

Figures 11A, 11B, 11C, 11D, 11E, 11F, 11G, 11H:
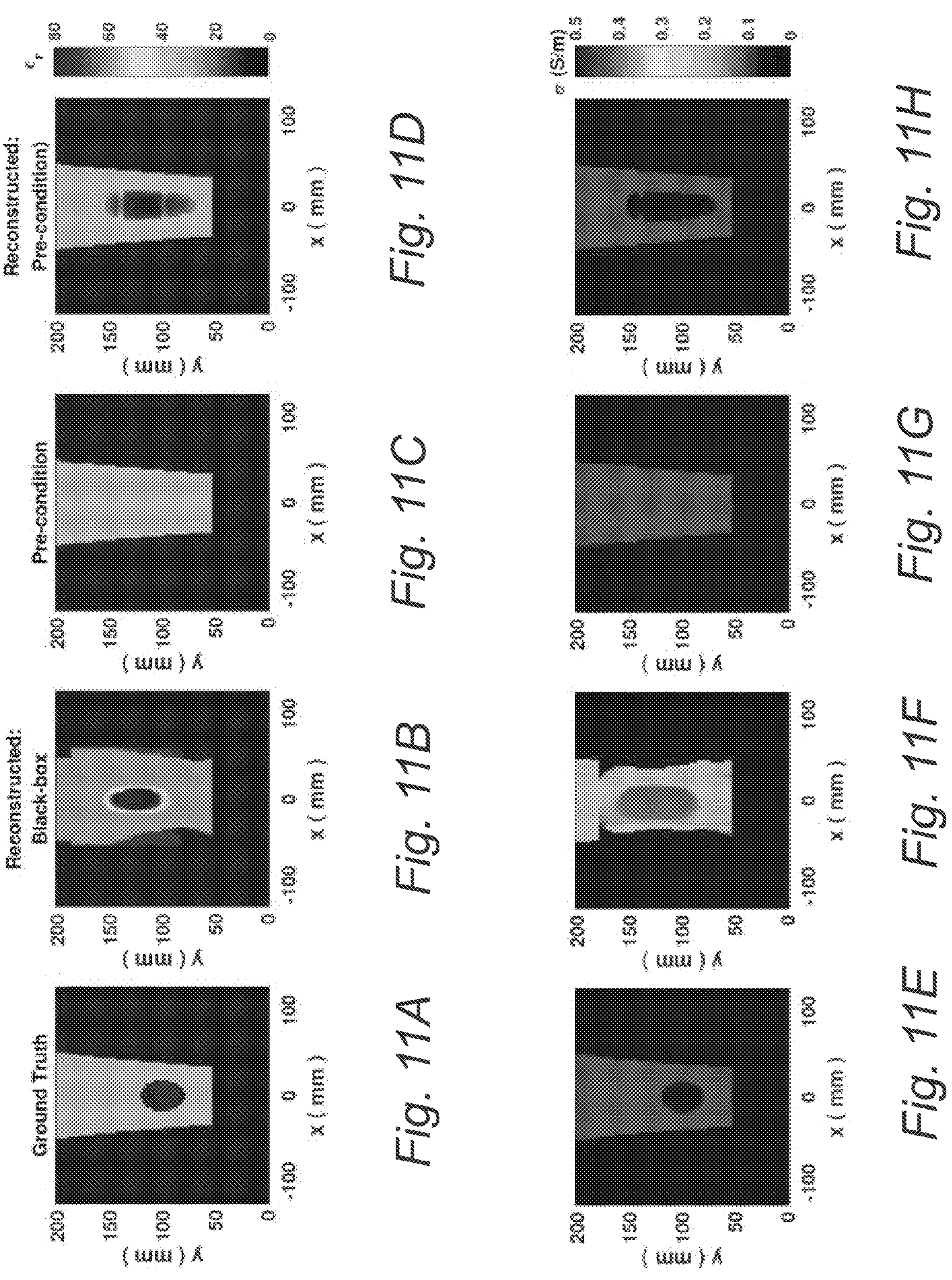
FIGS. 11A, 11B, 11C, 11D, 11E, 11F, 11G, and 11H. The relative permittivity images at 545 MHz of Phantom 2 in xy-view. Images at top row are the relative permittivty, and bottom-row images are the conductivity. (A), (E) are the ground truth relative permittivity and conductivity images; (C), (G) are the preconditioned dielectric maps for the BC-VBIM inverse algorithm; (B), (F) are the reconstructed results under the black-box test; (D), (H) are the reconstructed results with the preconditions in (C) and (G).

To accurately estimate the target dielectric properties inside the object, we use the cup geometry and its fluid dielectric values in FIGS. 10(C), (G) and FIGS. 11(C), (G) as the preconditioner for our inverse algorithm. With this preconditioner, we can eliminate the effect of the object from the received scattered signal to focus on the target reconstruction. As shown in FIGS. 10(D),(H), both relative permittivity and conductivity of the target are estimated more accurately without any significant anomaly compared with the black-box reconstructed images in FIGS. 10(B),(F). The shape and location of the target in FIG. 10(D),(H) are closer to the ground truth images in FIG. 10(A),(E). Therefore, it may be concluded that our MWI system prototype can detect the target without prior knowledge, and it can estimate the target information accurately with proper preconditioners.

The same conclusion can be obtained after analyzing the reconstructed images at 545 MHz in FIG. 11.

In the preconditioned imaging case, the AVEs of preconditioned reconstructed images are 1.4% at 1115 MHz and 545 MHz. The RMSE value at 1115 MHz decreases from 6.6 to 4.4. At 545 MHz, the RMSE decreases by 3.5 from 7.8 in the black-box imaging. Both RMSE and AVE values indicate that preconditioned imaging is more accurate than the black-box imaging (Tables II and III). In addition, the BC-VBIM requires fewer convergence steps under preconditioned imaging compared to black-box imaging, since the initial difference between the reconstructed data and input data is small for the preconditioned imaging.

C. Phantom 3: Clustered Ping-Pong Balls

Imaging results of Ph 2 corroborate that our MWI system prototype: a) can precisely estimate the dielectric properties of targets at both operational frequencies with proper preconditioning, and b) has the capability to distinguish targets with different dielectric values from a surrounding object under the black-box test condition with a relatively high accuracy (>74%). To further support our evaluation conclusion, we design a more complicated phantom model (Ph 3) in this subsection to evaluate our system imaging functionality in the presence of high background clutter instead of a simple surrounding object. Phantom 3 in FIG. 5(C) has a ping-pong ball filled with water (target) and is surrounded by six balls filled with 75% isopropyl alcohol (objects). Table I shows side-by-side comparison of the dielectric properties of Ph 3 and Ph 2, where the relative permittivity value of the water ball (target) is larger than surrounding objects with 75% isopropyl alcohol—25% water mixture. However, the conductivity of the target is smaller than these objects.

Figures 12A, 12B, 12C, 12D, 12E, 12F, 12G, 12H:
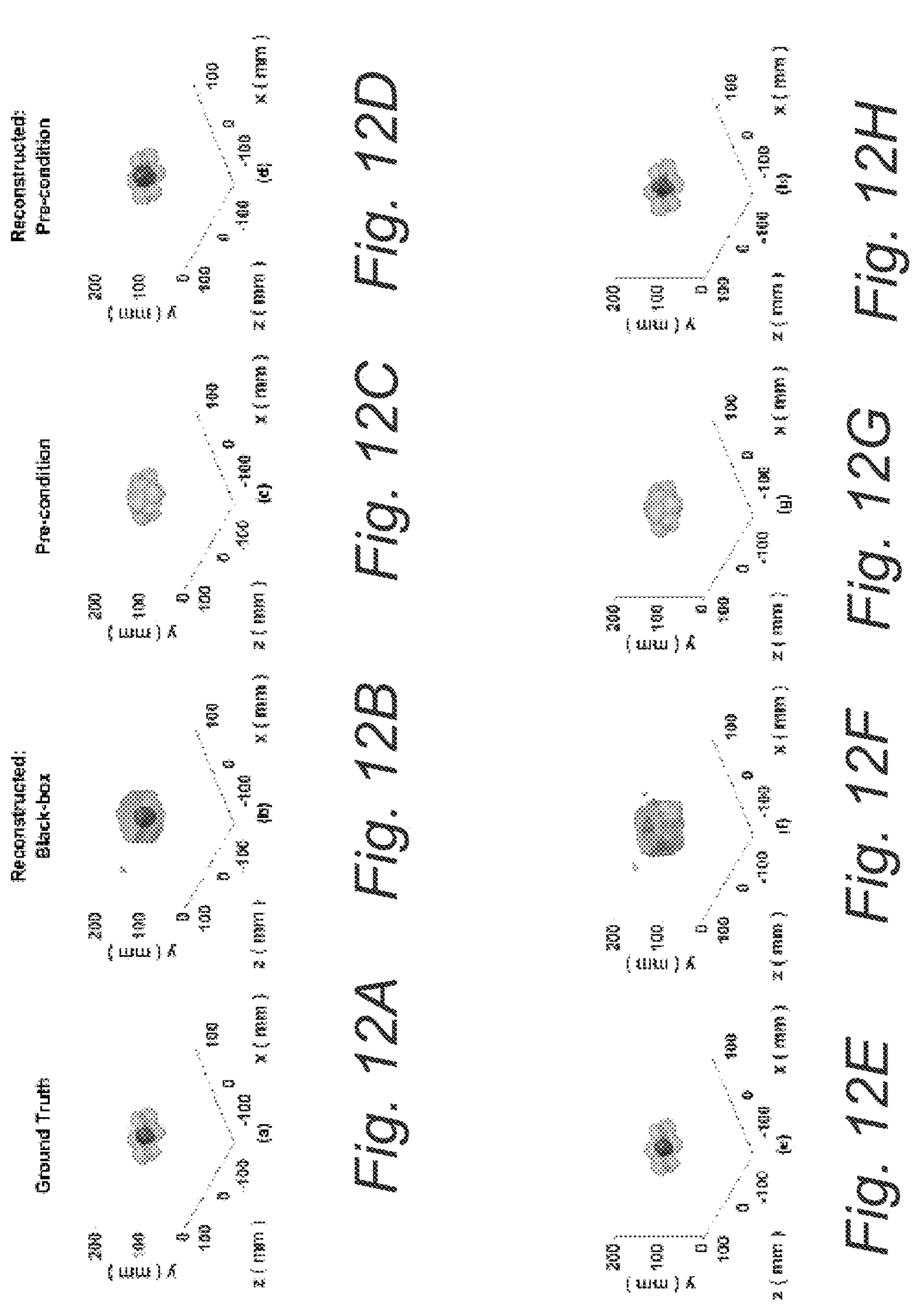
FIGS. 12A, 12B, 12C, 12D, 12E, 12F, 12G, and 12H. The relative permittivity images at 1115 MHz of Phantom 3 in 3D-view. Images at top row are the relative permittivty, and bottom-row images are the conductivity. (A), (E) are the ground truth relative permittivity and conductivity images; (C), (G) are the preconditioned dielectric maps for the BC-VBIM inverse algorithm; (B), (F) are the reconstructed results under the black-box test; (D), (H) are the reconstructed results with the pre-conditions in (C) and (G).
Figures 13A, 13B, 13C, 13D, 13E, 13F, 13G, 13H:
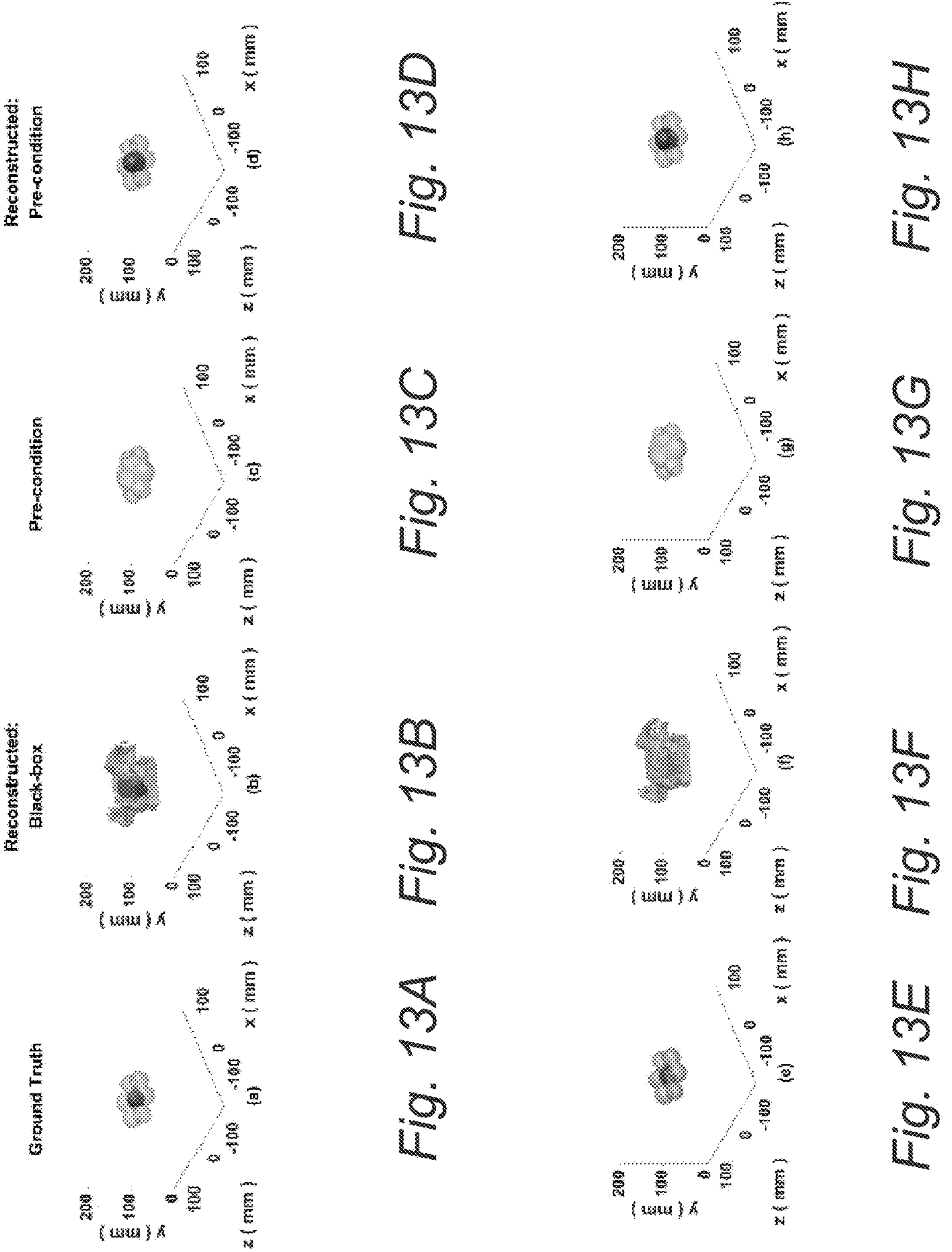
FIGS. 13A, 13B, 13C, 13D, 13E, 13F, 13G, and 13H. The relative permittivity images at 545 MHz of Phantom 3 in 3D-view. Images at top row are the relative permittivty, and bottom-row images are the conductivity. (A), (E) are the ground truth relative permittivity and conductivity images; (C), (G) are the preconditioned dielectric maps for the BC-VBIM inverse algorithm; (B), (F) are the reconstructed results under the black-box test; (D), (H) are the reconstructed results with the pre-conditions in (C) and (G).
Figures 14A, 14B, 14C, 14D, 14E, 14F, 14G, 14H:
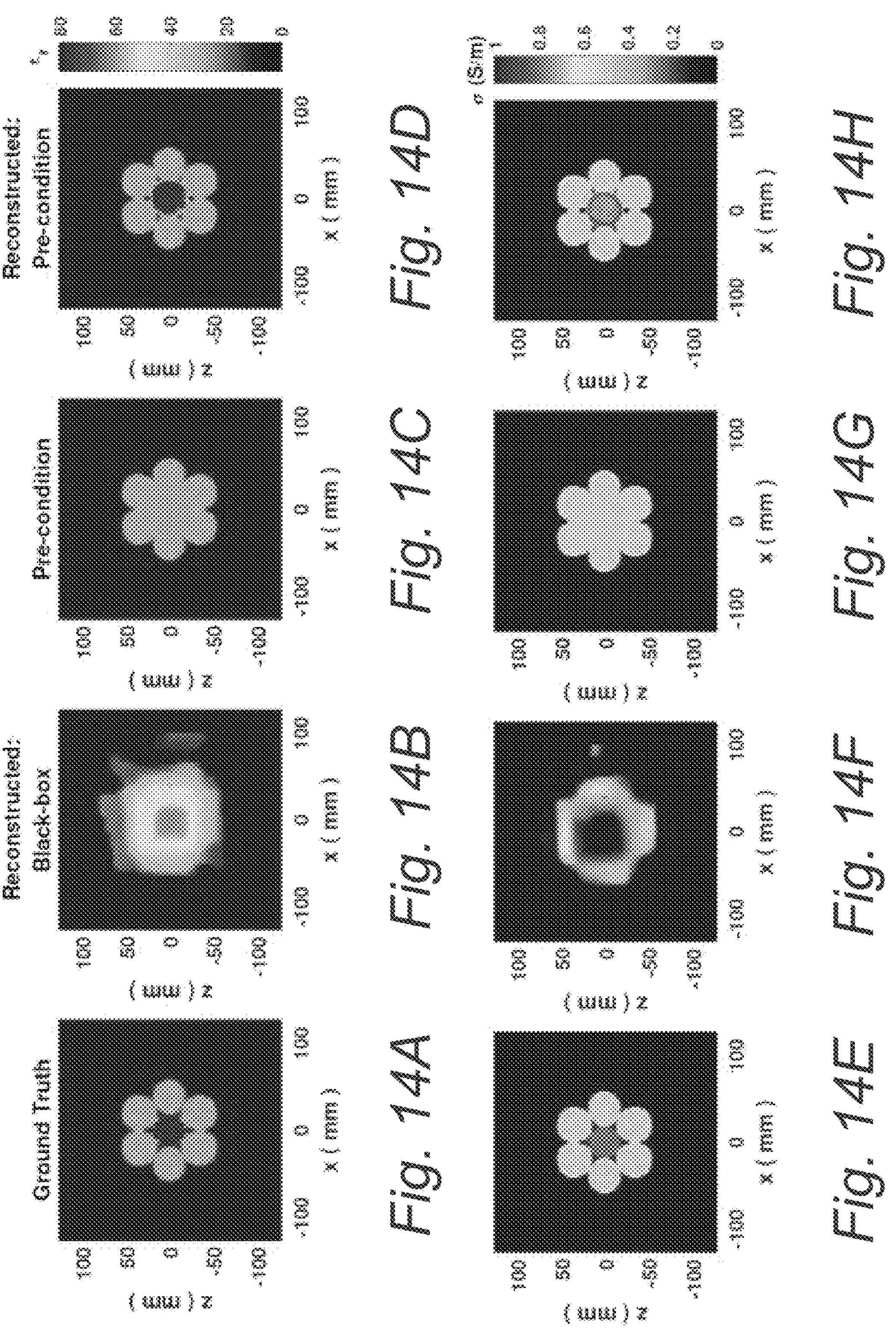
FIGS. 14A, 14B, 14C, 14D, 14E, 14F, 14G, and 14H. The relative permittivity images at 1115 MHz of Phantom 3 in xz-view. Images at top row are the relative permittivty, and bottom-row images are the conductivity. (A), (E) are the ground truth relative permittivity and conductivity images; (C), (G) are the preconditioned dielectric maps for the BC-VBIM inverse algorithm; (B), (F) are the reconstructed results under the black-box test; (D), (H) are the reconstructed results with the pre-conditions in (C) and (G).
Figures 15A, 15B, 15C, 15D, 15E, 15F, 15G, 15H:
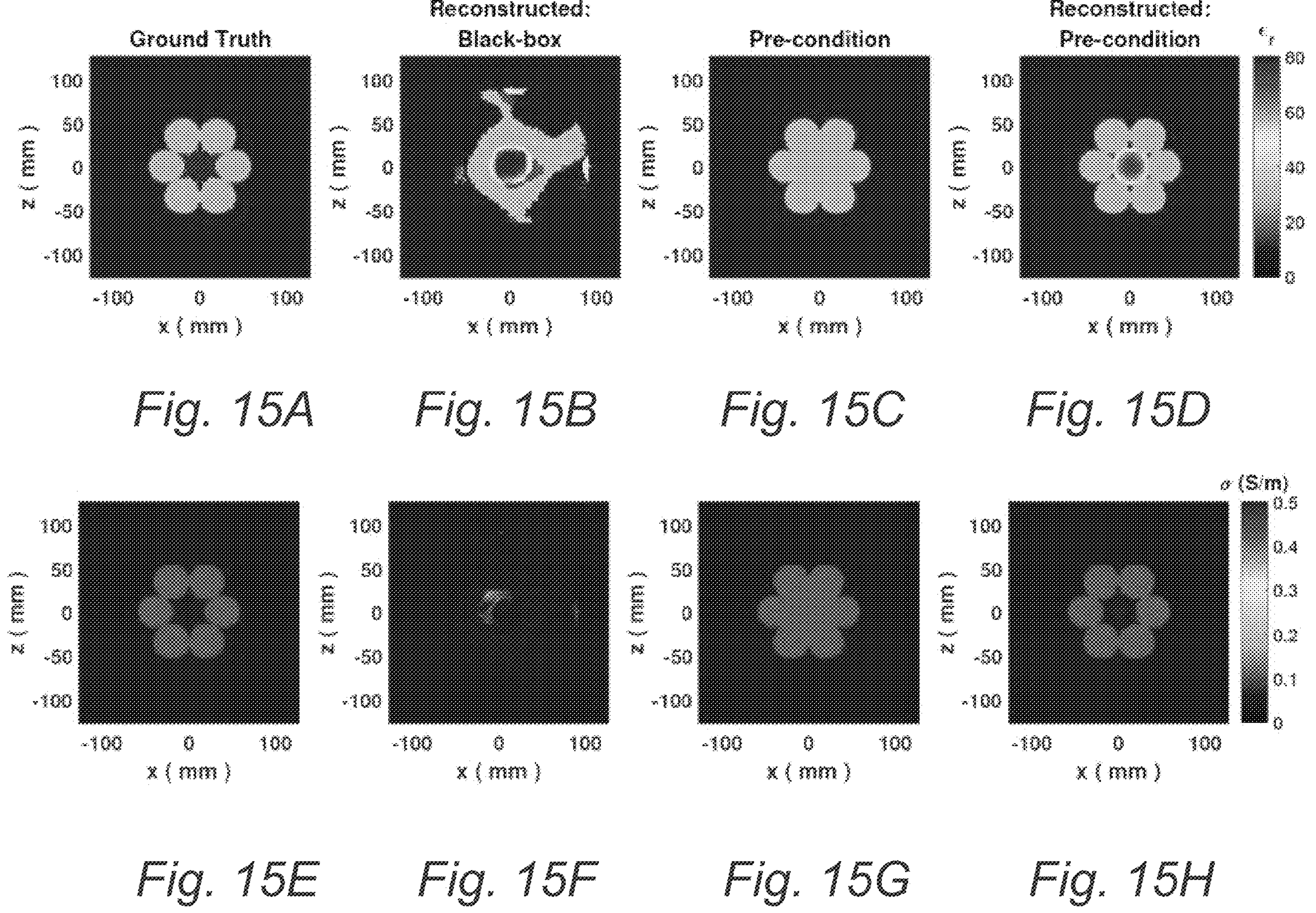
FIGS. 15A, 15B, 15C, 15D, 15E, 15F, 15G, and 15H. The relative permittivity images at 545 MHz of Phantom 3 in xz-view. Images at top row are the relative permittivty, and bottom-row images are the conductivity. (A), (E) are the ground truth relative permittivity and conductivity images; (C), (G) are the preconditioned dielectric maps for the BC-VBIM inverse algorithm; (B), (F) are the reconstructed results under the black-box test; (D), (H) are the reconstructed results with the pre-conditions in (C) and (G).

FIG. 12 and FIG. 14 show the black-box and pre-condition imaging results of the relative permittivity and conductivity at 1115 MHz, and FIG. 13 and FIG. 15 show the imaging results at 545 MHz. Same as the Ph 2 results in FIGS. 10-11(B),(F), the black-box reconstructed images in FIGS. 12-15(B),(F) cannot precisely quantify both geometric and dielectric properties of the target and surrounding objects. One can still distinguish the target distribution area, size and location from the surrounding objects with our MWI system imaging results. On the one hand, imaging results reconstructed at 1115 MHz in FIGS. 12(B),(F) shows a better reconstruction of the target location and size, and the area of surrounding objects compared with reconstructed images under 545 MHz as in FIGS. 13(B),(F). On the other hand, FIGS. 15(B),(F) indicate that reconstruction under 545 MHz can perform better in estimating the dielectric properties of the target and objects than results in FIGS. 14(B),(F). More importantly, reconstructed results at both frequencies in FIGS. 12-15(B),(F) demonstrate that our MWI system can reconstruct the water ball target dielectric qualitative properties. From Tables II and III, the black-box imaging accuracy for the Ph 3 dielectric reconstruction is higher than that for Ph 2. This is due to a stronger scattered signal caused by a larger object.

Table III further exhibits that the black-box reconstruction for Ph 3 can achieve more than 81% accuracy at both frequencies. Even though this is a high level of accuracy for black-box 3D MWI reconstruction with observed data, estimating the exact shape and dielectric values of the target and surrounding objects is not simple. Since many medical treatments require imaging techniques to accurately segment malignant areas from the healthy tissues and monitor the disease severity, we need an appropriate preconditioner to estimate the target shape and dielectric values with a higher accuracy level (e.g., >98%) [13], [38]. Before medical treatments, MRI and CT data that show accurate information of the locations and shapes of treatment targets and surrounding tissues can be provided to the MWI system imaging module to achieve high- and super-resolution imaging [13], [38].

To validate the robustness of our system imaging results, we construct the 3D pre-condition dielectric images as shown in FIGS. 12-15(C),(G). The pre-condition images have a cylinder inserted in the outer six balls. The boundaries of the inner cylinder in FIGS. 12(C),(G) and 13(C),(G) are determined from the black-box reconstruction results in FIGS. 12-15(B),(F), which is a possible area of the target. These preconditioning images contain the known dielectric values and outer boundaries of the surrounding six balls.

With the initial 3D dielectric map in FIGS. 12-15(C),(G) as the preconditioners for the inverse algorithm, the target shape and dielectric values can be accurately reconstructed as in FIGS. 12-15(D),(H). The boundary difference between the reconstructed and ground truth target is less than one voxel (2 mm) in FIGS. 14-15(D),(H). As for the dielectric imaging performance, our MWI system prototype can reconstruct the permittivity ($\epsilon r$) map (FIG. 14(D)) at 1115 MHz with higher accuracy than the $\epsilon r$ at 545 MHz (FIG. 15(D)). Contrary to the permittivity reconstruction, data measured at 545 MHz can help generate a conductivity ($\sigma$) map (FIG. 15(H)) that has a smaller difference from the ground truth images than the $\sigma$ reconstructed at 1115 MHz (FIG. 14(H)). In this preconditioned imaging case, the AVE of preconditioned reconstructed image is 1.7% at 1115 MHz and 1.8% at 545 MHz, where the RMSE is 4.6 at 1115 MHz, and 4.1 at 545 MHz.

III. CONCLUSION

This paper presented a novel microwave imaging system prototype for 3D dielectric reconstruction. To maintain the dielectric contrast between target and background in the long-term imaging test, a newly compounded emulsion as the coupling fluid was filled in the imaging cavity. A new quad-band tapered patch antenna array was designed by considering the transmission in the presence of coupling fluid. The antenna was fabricated and provided the capability for multi-frequency measurement. For 3D dielectric imaging, the bounding constraints were applied in the VBIM inverse algorithm workflow, which helped us avoid the unrealistic dielectric anomalies during the reconstruction. Additionally, an end-to-end data acquisition system enabled fully calibrated scattered parameters measurement for 768 data channels.

To validate the MWI system prototype performance in detecting targets' presence and estimating their dielectric properties under a complex 3D scenario, we designed three phantom models for the reconstruction experiments. The black-box imaging test was conducted in all these reconstructions. Imaging results of Ph 1 indicated that our MWI system could distinguish multiple targets with neighboring spacing of Ab/4 or larger and evaluate their dielectric properties accurately. Black-box reconstructed images of Ph 2 and 3 showed that our MWI system could detect the presence of targets embedded within complicated objects representative of high-clutter backgrounds, and qualitatively evaluate dielectric properties of both target and objects. Moreover, by conducting reconstruction with preconditioners, the MWI system can accurately reconstruct the dielectric properties of the target with appropriate prior information about the objects. This MWI system prototype has many potential prospects for microwave tomography, particularly for medical applications. Our future work will develop a multi-frequency inverse algorithm for dielectric imaging with measured data from all chosen frequencies, and design a real-time data acquisition scheme that enables thermal therapy monitoring using microwave imaging.

Additional details of the dielectric imaging system and related methods are found in Y. Fang, K. Bakian-Dogaheh and M. Moghaddam, "A Multi-Frequency Inverse Algorithm for 3D Microwave Imaging," in IEEE Transactions on Antennas and Propagation, doi: 10.1109/TAP.2023.3312771; Y. Fang, K. Bakian-Dogaheh and M. Moghaddam, "Real-Time 3D Microwave Medical Imaging With Enhanced Variational Born Iterative Method," in *IEEE Transactions on Medical Imaging*, vol. 42, no. 1, pp. 268-280, January 2023, doi: 10.1109/TMI.2022.3210494; K. Bakian-Dogaheh, Y. Fang and M. Moghaddam, "A Quad-Band Near-Field Antenna Array for a Multistatic Microwave Imaging Chamber," in *IEEE Antennas and Wireless Propagation Letters*, vol. 22, no. 7, pp. 1657-1661, July 2023, doi: 10.1109/LAWP.2023.3257709; and Fang Y, Bakian-Dogaheh K, Stang J, Tabatabaeenejad A, Moghaddam M. A Versatile and Shelf-Stable Dielectric Coupling Medium for Microwave Imaging. IEEE Trans Biomed Eng. 2022 August; 69(8):2701-2712. doi: 10.1109/TBME.2022.3153003. Epub 2022 Jul. 18. PMID: 35196220; the entire disclosures of these papers are incorporated by reference in their entirety.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

REFERENCES

[1] S. Kwon and S. Lee, "Recent advances in microwave imaging for breast cancer detection," International journal of biomedical imaging, vol. 2016, 2016.

[2] J. Sachs, S. Ley, T. Just, S. Chamaani, and M. Helbig, "Differential ultra-wideband microwave imaging: Principle application challenges," Sensors, vol. 18, no. 7, p. 2136, 2018.

[3] M. Mahmud, M. T. Islam, N. Misran, A. F. Almutairi, M. Cho et al., "Ultra-wideband (UWB) antenna sensor based microwave breast imaging: A review," Sensors, vol. 18, no. 9, p. 2951, 2018.

[4] N. K. Nikolova, "Microwave imaging for breast cancer," IEEE microwave magazine, vol. 12, no. 7, pp. 78-94, 2011.

[5] A. Abubakar, P. Van den Berg, and S. Y. Semenov, "Two- and three-dimensional algorithms for microwave imaging and inverse scattering," Journal of Electromagnetic Waves and Applications, vol. 17, no. 2, pp. 209-231, 2003.

[6] B. Borja, J. A. Tirado, and H. Jardon, "An overview of uwb antennas for microwave imaging systems for cancer detection purposes." Progress In Electromagnetics Research B, vol. 80, 2018.

[7] P. Tournier, M. Bonazzoli, V. Dolean, F. Rapetti, F. Hecht, F. Nataf,I. Aliferis, I. El Kanfoud, C. Migliaccio, M. de Buhan, M. Darbas, S. Semenov, and C. Pichot, "Numerical modeling and high-speed parallel computing: New perspectives on tomographic microwave imaging for brain stroke detection and monitoring." IEEE Antennas and Propagation Magazine, vol. 59, no. 5, pp. 98-110, October 2017.

[8] J. Bourqui, M. Okoniewski, and E. C. Fear, "Balanced antipodal vivaldi antenna with dielectric director for near-field microwave imaging," IEEE Transactions on Antennas and Propagation, vol. 58, no. 7, pp. 2318-2326, 2010.

[9] J. D. Shea, P. Kosmas, S. C. Hagness, and B. D. Van Veen, "Three-dimensional microwave imaging of realistic numerical breast phantoms via a multiple-frequency inverse scattering technique," Medical physics, vol. 37, no. 8, pp. 4210-4226, 2010.

[10] K. Kanazawa, K. Noritake, Y. Takaishi, and S. Kidera, "Microwave imaging algorithm based on waveform reconstruction for microwave ablation treatment," IEEE Transactions on Antennas and Propagation, vol. 68, no. 7, pp. 5613-5625, 2020.

[11] Y. Suzuki and S. Kidera, "Resolution enhanced distorted born iterative method using roi limiting scheme for microwave breast imaging," IEEE Journal of Electromagnetics, RF and Microwaves in Medicine and Biology, vol. 5, no. 4, pp. 379-385, 2021.

[12] S. Kidera, L. M. Neira, B. D. Van Veen, and S. C. Hagness, "Tdoa-based microwave imaging algorithm for real-time microwave ablation monitoring," International Journal of Microwave and Wireless Technologies, vol. 10, no. 2, pp. 169-178, 2018.

[13] G. Chen, J. Stang, M. Haynes, E. Leuthardt, and M. Moghaddam, "Real-time three-dimensional microwave monitoring of interstitial thermal therapy," IEEE Transactions on Biomedical Engineering, vol. 65, no. 3, pp. 528-538, 2018.

[14] G. Chen, P. Shah, J. Stang, and M. Moghaddam, "Learning-assisted multimodality dielectric imaging," IEEE Transactions on Antennas and Propagation, vol. 68, no. 3, pp. 2356-2369, 2020.

[15] N. Abdollahi, D. Kurrant, P. Mojabi, M. Omer, E. Fear, and J. LoVetri, "Incorporation of ultrasonic prior information for improving quantitative microwave imaging of breast," IEEE Journal on Multiscale and Multiphysics Computational Techniques, vol. 4, pp. 98-110, 2019.

[16] C. Gilmore, A. Zakaria, S. Pistorius, and J. LoVetri, "Microwave imaging of human forearms: Pilot study and image enhancement," International journal of biomedical imaging, vol. 2013, 2013.

[17] L. Guo and A. M. Abbosh, "Optimization-based confocal microwave imaging in medical applications," IEEE Trans. Antennas Propag., vol. 63, no. 8, pp. 3531-3539, 2015.

[18] B. J. Mohammed, A. M. Abbosh, S. Mustafa, and D. Ireland, "Microwave system for head imaging," IEEE Trans. Instrum. Meas., vol. 63, no. 1, pp. 117-123, 2013.

[19] M. Haynes, J. Stang, and M. Moghaddam, "Real-time microwave imaging of differential temperature for thermal therapy monitoring," IEEE Transactions on Biomedical Engineering, vol. 61, no. 6, pp. 1787-1797, 2014.

[20] V. L. Coli, P. Tournier, V. Dolean, I. E. Kanfoud, C. Pichot, C. Migliaccio, and L. Blanc-F'eraud, "Detection of simulated brain strokes using microwave tomography," IEEE Journal of Electromagnetics, RF and Microwaves in Medicine and Biology, vol. 3, no. 4, pp. 254-260, December 2019.

[21] P. M. Meaney, C. J. Fox, S. D. Geimer, and K. D. Paulsen, "Electrical characterization of glycerin: Water mixtures: Implications for use as a coupling medium in microwave tomography," IEEE Transactions on Microwave Theory and Techniques, vol. 65, no. 5, pp. 1471-1478, May 2017.

[22] M. J. Pallone, P. M. Meaney, and K. D. Paulsen, "Surface scanning through a cylindrical tank of coupling fluid for clinical microwave breast imaging exams," Medical physics, vol. 39, no. 6Part1, pp. 3102-3111, 2012.

[23] J. M. Sill and E. C. Fear, "Tissue sensing adaptive radar for breast cancer detection-experimental investigation of simple tumor models," IEEE Transactions on Microwave Theory and Techniques, vol. 53, no. 11, pp. 3312-3319, November 2005.

[24] P. M. Meaney, M. W. Fanning, D. Li, S. P. Poplack, and K. D. Paulsen, "A clinical prototype for active microwave imaging of the breast," IEEE Transactions on Microwave Theory and Techniques, vol. 48, no. 11, pp. 1841-1853, 2000.

[25] Y. Fang, K. Bakian-Dogaheh, J. Stang, A. Tabatabaeenejad, and

M. Moghaddam, "A versatile and shelf-stable dielectric coupling medium for microwave imaging," IEEE Trans. Biomed. Eng., vol. 69, no. 8, pp. 2701-2712, 2022.

[26] Y. Rahmat-Samii, L. I. Williams, and R. G. Yaccarino, "The UCLA bi-polar planar-near-field antenna-measurement and diagnostics range," IEEE Antennas and Propagation Magazine, vol. 37, no. 6, pp. 16-35, 1995.

[27] C. A. Balanis, Antenna theory: analysis and design. John Wiley & Sons, 2016.

[28] A. Yaghjian, "An overview of near-field antenna measurements," IEEE Transactions on antennas and propagation, vol. 34, no. 1, pp. 30-45, 1986.

[29] R. W. P. King, G. S. Smith, M. Owens, and T. T. Wu, "Antennas in matter: Fundamentals, theory, and applications," NASA STI/Recon Technical Report A, vol. 81, p. 29690, 1981.

[30] S. M. Aguilar, M. A. Al-Joumayly, J. D. Shea, N. Behdad, and S. C. Hagness, "Design of a microwave breast imaging array composed of dual-band miniaturized antennas," in 2011 XXXth URSI General Assembly and Scientific Symposium, 2011, pp. 1-4.

[31] M. Manteghi and A. A. Y. Ibraheem, "On the study of the near-fields of electric and magnetic small antennas in lossy media," IEEE Transactions on antennas and propagation, vol. 62, no. 12, pp. 6491-6495, 2014.

[32] M. A. Aldhaeebi, T. S. Almoneef, H. Attia, and O. M. Ramahi, "Near-field microwave loop array sensor for breast tumor detection," IEEE Sensors Journal, vol. 19, no. 24, pp. 11 867-11 872, 2019.

[33] C. Tai and R. E. Collin, "Radiation of a hertzian dipole immersed in a dissipative medium," IEEE Transactions on Antennas and Propagation, vol. 48, no. 10, pp. 1501-1506, 2000.

[34] J. Kim and Y. Rahmat-Samii, "Implanted antennas inside a human body: Simulations, designs, and characterizations," IEEE Transactions on microwave theory and techniques, vol. 52, no. 8, pp. 1934-1943, 2004.

[35] K. Bakian-Dogaheh, Y. Fang, J. Stang, and M. Moghaddam, "Quad-band antenna array for a fluid filled microwave imaging chamber," IEEE Antennas Wireless Propag. Lett., Submitted, 2022.

[36] A. Abubakar, T. M. Habashy, G. Pan, and M. Li, "Application of the multiplicative regularized Gauss-Newton algorithm for three-dimensional microwave imaging," IEEE Transactions on Antennas and Propagation, vol. 60, no. 5, pp. 2431-2441, 2012.

[37] I. Bisio, C. Estatico, A. Fedeli, F. Lavagetto, M. Pastorino, A. Randazzo, and A. Sciarrone, "Variable-exponent lebesgue-space inversion for brain stroke microwave imaging," IEEE Transactions on Microwave Theory and Techniques, vol. 68, no. 5, pp. 1882-1895, 2020.

[38] P. Shah, G. Chen, J. Stang, and M. Moghaddam, "3-D level set method for joint contrast and shape recovery in microwave imaging," IEEE Trans. Comput. Imag, vol. 5, no. 1, pp. 97-108, March 2019.

[39] L. M. Neira, B. D. Van Veen, and S. C. Hagness, "High-resolution microwave breast imaging using a 3-d inverse scattering algorithm with a variable-strength spatial prior constraint," IEEE Transactions on Antennas and Propagation, vol. 65, no. 11, pp. 6002-6014, 2017.

[40] Y. Fang, Y. Hu, Q. Zhan, and Q. H. Liu, "Electromagnetic forward and inverse algorithms for 3-D through-casing induction mapping of arbitrary fractures," IEEE Geoscience and Remote Sensing Letters, vol. 15, no. 7, pp. 996-1000, 2018.

[41] Y. Fang, K. Bakian-Dogaheh, and M. Moghaddam, "Real-time 3D microwave medical imaging with enhanced variational Born iterative method," IEEE Trans. Med. Imag., pp. 1-14, 2022.

[42] T. M. Habashy, R. W. Groom, and B. R. Spies, "Beyond the Born and Rytov approximations: A nonlinear approach to electromagnetic scattering," Journal of Geophysical Research: Solid Earth, vol. 98, no. B2, pp. 1759-1775, 1993.

[43] D. Rytting, "Network analyzer error models and calibration methods," White Paper, September, 1998.

[44] O. Karadima, M. Rahman, I. Sotiriou, N. Ghavami, P. Lu, S. Ahsan, and P. Kosmas, "Experimental validation of microwave tomography with the dbim-twist algorithm for brain stroke detection and classification," Sensors, vol. 20, no. 3, p. 840, 2020.

[45] C. Kaye, I. Jeffrey, and J. LoVetri, "Improvement of multi-frequency microwave breast imaging through frequency cycling and tissue-dependent mapping," IEEE Transactions on Antennas and Propagation, vol. 67, no. 11, pp. 7087-7096, 2019.

[46] M. Asefi, A. Baran, and J. LoVetri, "An experimental phantom study for air-based quasi-resonant microwave breast imaging," IEEE Trans. Microw. Theory Tech., vol. 67, no. 9, pp. 3946-3954, 2019.

[47] G. Chen, J. Stang, and M. Moghaddam, "Numerical vector Green's function for S-parameter measurement with waveport excitation," IEEE Trans. Antennas Propag., vol. 65, no. 7, pp. 3645-3653, July 2017.

[48] T. J. Cui, W. C. Chew, X. X. Yin, and W. Hong, "Study of resolution and super resolution in electromagnetic imaging for half-space problems," IEEE Trans. Antennas Propag., vol. 52, no. 6, pp. 1398-1411, 2004.

[49] C. Yu, M. Yuan, and Q. H. Liu, "Reconstruction of 3D objects from multi-frequency experimental data with a fast DBIM-BCGS method," Inverse Problems, vol. 25, no. 2, p. 024007, 2009.

[50] M. Moghaddam, "Forward and inverse scattering problems in the time domain," Ph.D. dissertation, University of Illinois at Urbana-Champaign, 1991.

[51] K. P. Gaikovich and P. K. Gaikovich, "Inverse problem of near-field scattering in multilayer media," Inverse Problems, vol. 26, no. 12, p. 125013, 2010.

[52] C. Gilmore, P. Mojabi, A. Zakaria, S. Pistorius, and J. LoVetri, "On super-resolution with an experimental microwave tomography system," IEEE Antennas and Wireless Propagation Letters, vol. 9, pp. 393-396, 2010.

What is claimed is:

1. A dielectric imaging system comprising:

an imaging cavity for holding a sample to be imaged;

a coupling fluid disposed in the imaging cavity;

a plurality of antennas positioned in electrical communication with the coupling fluid, the plurality of antennas configured to have a plurality of resonant frequencies, the plurality of antennas including a first subset of antennas configured as receiver antennas and a second set of antennas configured as transmitter antennas; wherein the plurality of antennas is a quad-band tapered patch antenna array;

a source of power for the plurality of antennas;

a data acquisition and data post-processing system; and a dielectric reconstruction system, the dielectric imaging system being configured to operate at frequencies from 0.5 to 3 GHz.

2. The dielectric imaging system of claim 1, wherein a 3D dielectric map is created from measured data at each resonance frequency.

3. The dielectric imaging system of claim 2, wherein the 3D dielectric map is created from measured data at a plurality of resonance frequencies.

4. The dielectric imaging system of claim 1, wherein the data acquisition and data post-processing system is configured to execute data calibration and correction procedures.

5. The dielectric imaging system of claim 4, wherein the data acquisition and data post-processing system is configured to implement a calibration procedure and post-processing algorithm, to acquire coherent scattering parameters of each transmit-receive pairs.

6. The dielectric imaging system of claim 1, wherein the data acquisition and data post-processing system is configured to provide processed data to the dielectric reconstruction system.

7. The dielectric imaging system of claim 1, wherein the dielectric reconstruction system is configured to execute an inverse algorithm for dielectric imaging.

8. The dielectric imaging system of claim 7, wherein the inverse algorithm is an enhanced variational Born iterative method with bounding constraints (BC-VBIM).

9. The dielectric imaging system of claim 7, wherein the inverse algorithm can utilize measured data at a plurality of resonance frequencies for 3D dielectric imaging.

10. The dielectric imaging system of claim 1, wherein the data acquisition and data post-processing system includes vector network analyzers (VNA) that use coherent receivers to characterize the phase and magnitude of measured signals.

11. The dielectric imaging system of claim 1, wherein the data acquisition and data post-processing system includes a plurality of switches configured to select receiver and transmit channels.

12. The dielectric imaging system of claim 1, wherein the coupling fluid is an oil-based emulsion.

13. The dielectric imaging system of claim 12, wherein the coupling fluid includes food-grade oil, acid fluid, and a protein-based mixture.

14. A dielectric imaging system comprising:

an imaging cavity for holding a sample to be imaged;

a coupling fluid disposed in the imaging cavity;

a plurality of antennas positioned in electrical communication with the coupling fluid, the plurality of antennas configured to have a plurality of resonant frequencies, the plurality of antennas including a first subset of antennas configured as receiver antennas and a second set of antennas configured as transmitter antennas, wherein the plurality of antennas is a quad-band tapered patch antenna array;

a source of power for the plurality of antennas;

a data acquisition and data post-processing system; and a dielectric reconstruction system.

15. The dielectric imaging system of claim 14, wherein a 3D dielectric map is created from measured data at each resonance frequency.

16. The dielectric imaging system of claim 15, wherein the 3D dielectric map is created from measured data at a plurality of resonance frequencies.

17. The dielectric imaging system of claim 14, wherein the data acquisition and data post-processing system is configured to execute data calibration and correction procedures.

* * * * *